US 7,014,369 B2

(12) United States Patent
Alcock et al.

(10) Patent No.: US 7,014,369 B2
(45) Date of Patent: Mar. 21, 2006

(54) OPTICAL FIBER CONNECTOR

(75) Inventors: Ian Peter Alcock, Petersfield (GB); Christopher John Wackett, Southampton (GB); David James Pointer, Southampton (GB)

(73) Assignee: Point Source Limited, (GB)

( * ) Notice: Subject to any disclaimer, the term of this patent is extended or adjusted under 35 U.S.C. 154(b) by 88 days.

(21) Appl. No.: 10/679,504

(22) Filed: Oct. 7, 2003

(65) Prior Publication Data

US 2004/0252948 A1 Dec. 16, 2004

(30) Foreign Application Priority Data

Oct. 8, 2002 (GB) .................................. 0223344
Feb. 11, 2003 (GB) .................................. 0303101

(51) Int. Cl.
G02B 6/38 (2006.01)

(52) U.S. Cl. ........................ 385/57; 385/11; 385/16; 385/37; 385/53

(58) Field of Classification Search ............... 385/6–11, 385/16–34, 37, 53–57
See application file for complete search history.

(56) References Cited

U.S. PATENT DOCUMENTS

| 3,655,275 A | 4/1972 | Seagreaves |
| 3,922,064 A | 11/1975 | Clark et al. |
| 4,009,931 A | 3/1977 | Malsby et al. |
| 4,146,300 A | 3/1979 | Kaiser |
| 4,193,664 A | 3/1980 | Ellwood |
| 4,215,913 A | 8/1980 | Turley et al. |
| 4,296,999 A | 10/1981 | Mead |
| 4,456,334 A | 6/1984 | Henry et al. |
| 4,649,616 A | 3/1987 | Bricker |
| 4,696,538 A | 9/1987 | Despouys |
| 4,753,510 A | 6/1988 | Sezerman |
| 4,852,959 A | 8/1989 | Werner et al. ............... 385/73 |
| 4,884,861 A | 12/1989 | Nodfelt |
| 4,889,406 A | 12/1989 | Sezerman |
| 5,163,114 A | 11/1992 | Hendow |
| 5,181,272 A | 1/1993 | Hopper |
| 5,208,888 A | 5/1993 | Steinblatt et al. |
| 5,247,595 A | 9/1993 | Foldi |

(Continued)

FOREIGN PATENT DOCUMENTS

DE          26 02 662       7/1997

(Continued)

OTHER PUBLICATIONS

"Optical Radiation Coupling into an Optical Fiber," Research Disclosure No. 38528 of May 1996, cited in the Search and Examination Report on the UK patent application corresponding to U.S. Appl. No. 09/073,960.

Primary Examiner—Phan T. H. Palmer
(74) Attorney, Agent, or Firm—Vierra Magen Marcus Harmon & DeNiro LLP

(57) ABSTRACT

An optical fiber connector comprising a main body in the form of a manipulator 11 having a throughbore which removably receives a sleeve-like carrier 13 again having a throughbore. The carrier 13 receives removably an optical fibre assembly which is to be coupled to another optical component by means of the connector. The manipulator 11 also includes two pairs of adjustment screws 18a, and 19a which can be used to displace the carrier and optical fibre assembly relative to the longitudinal axis of the manipulator. A polarising element 41 is arranged in the manipulator 11 such that light passing through the connector system will pass through the polarising element 41.

35 Claims, 12 Drawing Sheets

U.S. PATENT DOCUMENTS

| | | |
|---|---|---|
| 5,400,674 A | 3/1995 | Arnone et al. |
| 5,422,970 A | 6/1995 | Miller et al. |
| 5,509,093 A | 4/1996 | Miller et al. |
| 5,584,569 A | 12/1996 | Huang |
| 5,638,472 A | 6/1997 | Van Delden |
| 5,917,985 A | 6/1999 | Im |
| 6,276,843 B1 | 8/2001 | Alcock et al. |
| 6,386,766 B1 | 5/2002 | Lee |
| 2003/0174922 A1 * | 9/2003 | Hasui et al. .................. 385/11 |

FOREIGN PATENT DOCUMENTS

| | | |
|---|---|---|
| EP | 0 128 768 | 12/1984 |
| EP | 0 185 413 | 6/1988 |
| EP | 0 293 044 | 11/1988 |
| EP | 0 306 220 | 3/1989 |
| EP | 0443 454 | 8/1991 |
| EP | 0 457 284 | 11/1991 |
| EP | 0 720 033 A1 | 7/1996 |
| EP | 0 751 410 A2 | 1/1997 |
| EP | 0877 268 | 11/1998 |
| EP | 0 877 267 | 10/1999 |
| GB | 1 535 499 | 12/1978 |
| GB | 2 311 621 | 10/1997 |
| GB | 2 325 058 A | 11/1998 |
| GB | 2325058 | 11/1998 |
| JP | 8179158 A | 7/1996 |
| WO | WO 90/15350 | 12/1990 |
| WO | WO 99/46622 A1 | 9/1999 |
| WO | WO 02/19002 | 8/2001 |
| WO | WO 02/08805 | 1/2002 |
| WO | WO 02/08805 A2 | 1/2002 |

* cited by examiner

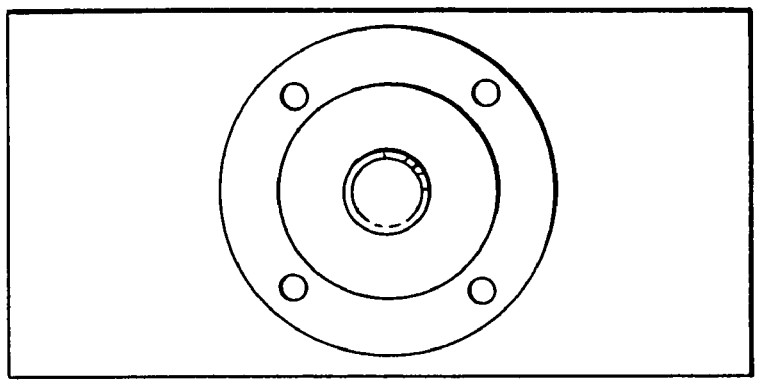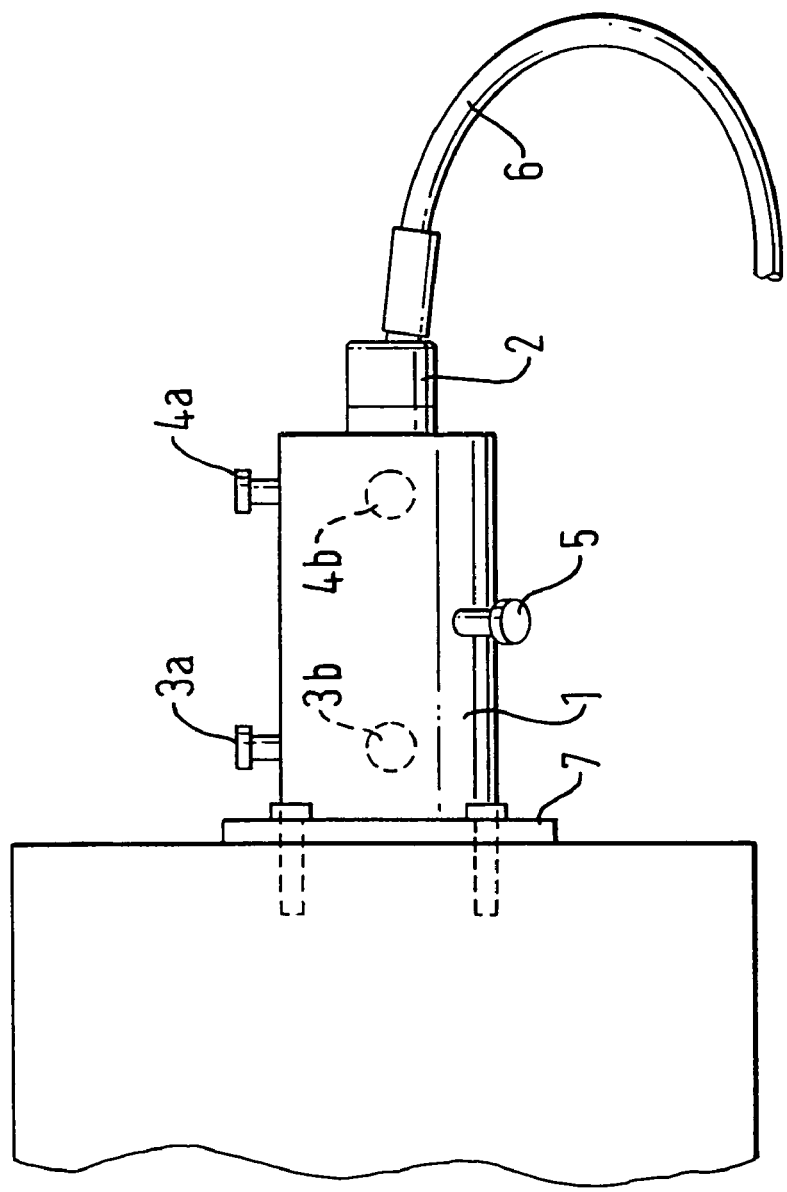
FIG. 1

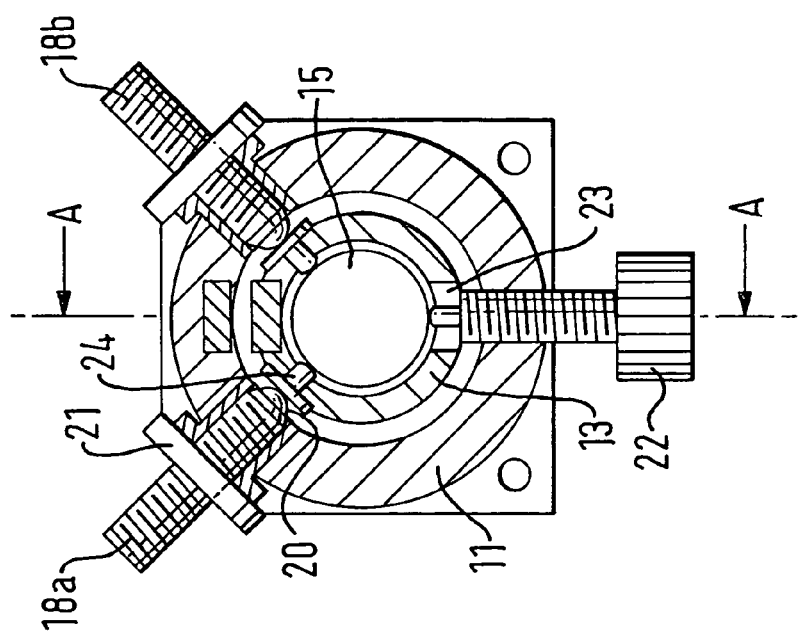
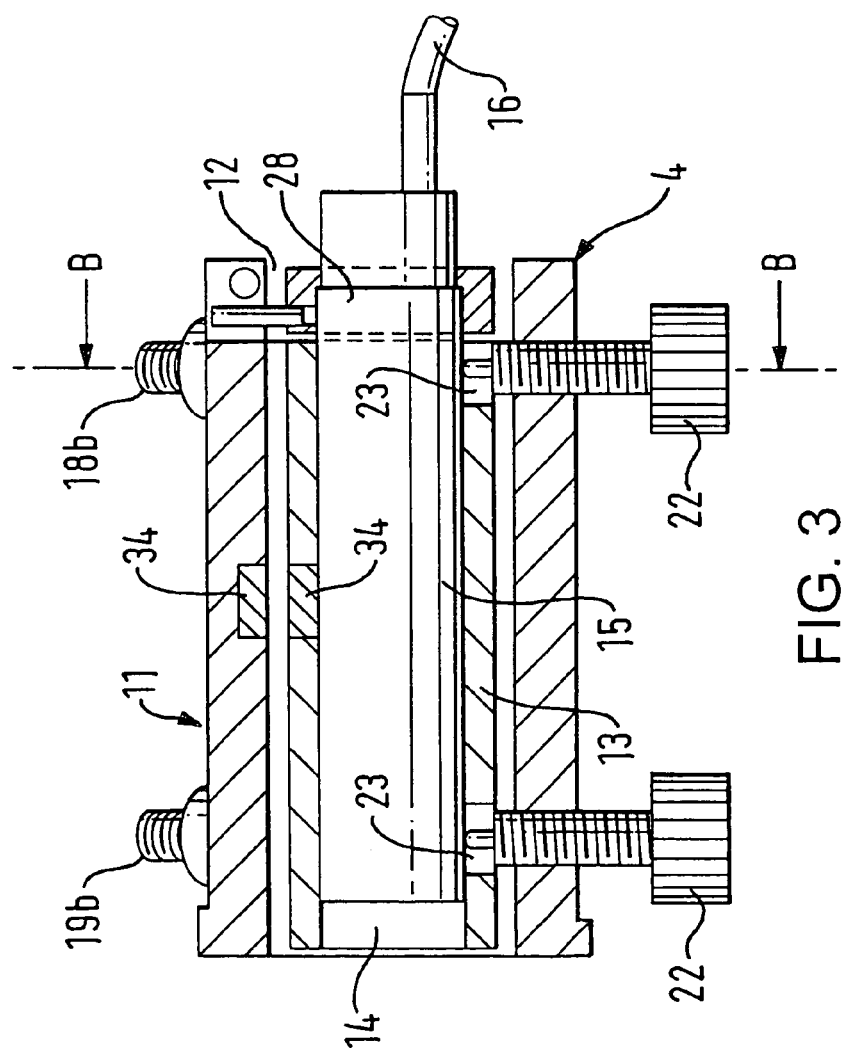
FIG. 4
FIG. 3

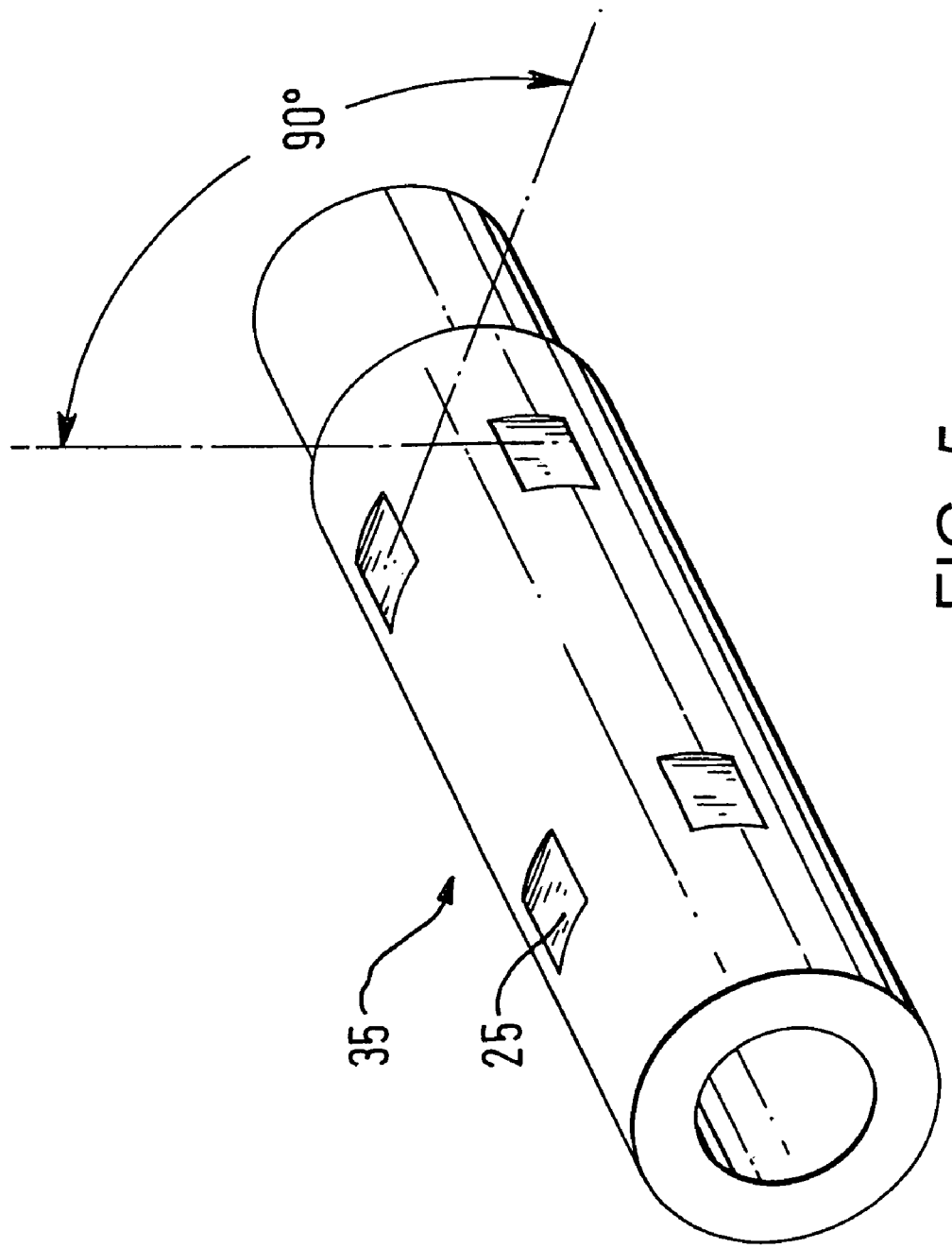

OPTICAL FIBER CONNECTOR

FIELD OF THE INVENTION

The present invention relates to connectors for coupling electromagnetic and in particular laser radiation into and out of optical fibres and components therefor. It relates in particular to connectors for use in optical and other systems where polarised electromagnetic radiation is being used or required.

BACKGROUND OF THE INVENTION

In many optical applications, electromagnetic radiation is transmitted along optical fibres and must therefore be coupled into the fibre at one end (for example from a laser source) and coupled out of the fibre at the other end into, for example, another optical fibre or some other optical component. In order to do this the radiation is typically focused on to the fibre end by one or more lenses, and lenses are similarly provided at the other end of the fibre to focus or collimate the exiting radiation.

One problem with such an arrangement is that both lateral misalignment between the optical axis of the fibre and the optical axis of the lens (or other optical component) and relative tilt between the central axes of the lens and fibre can lead to energy losses as the radiation is coupled into or out of the optical fibre.

In order to help reduce losses due to poor alignment between the fibre and lens (or other optical element), the end of the optical fibre and the lens are typically both mounted in a cylindrical tube in a predetermined fixed alignment with each other. This assembly is usually known as a lens barrel or a lens tube. The lens barrel holds the lens and fibre in a fixed, aligned relationship, thereby helping to avoid losses due to misalignment between the lens and fibre in use.

However, even with such an arrangement, losses can still occur due to misalignment between the fixed fibre and lens in the lens barrel and the laser source or other optical component to which the optical fibre is being optically coupled.

For example, any lateral displacement of the fibre and lens with respect to the incident radiation will cause the radiation impinging on the fibre end to be incident at an angle to the optical axis of the fibre. This could mean that some of the incident radiation falls outside the acceptance angle of the fibre, thereby leading to losses.

Furthermore, any tilt of the central axis of the radiation source with respect to the central axis of the fibre and lens arrangement will cause the focused radiation to be displaced across the end face of the fibre. This may result in some radiation missing the fibre end face.

These situations can be common when coupling radiation from a laser or other sources into an optical fibre, and in both cases, the coupling efficiency will be degraded.

A similar situation can arise with the radiation emerging from an optical fibre where alignment with other optical components is required, or radiation needs to be coupled from one optical fibre to another (either with or without additional components in between).

In order to reduce these alignment losses, the relative positions of the lens barrel and the laser source or other optical component to which the optical fibre is being coupled are often adjusted prior to use to try to optimise their alignment. In order to achieve this, the lens barrel is typically coupled to the laser source or optical component by means of a connector which allows the position of the lens barrel (and thus the fibre and lens) with respect to the laser source or optical component to be adjusted. Such a connector would typically provide adjustment of both tilt and lateral displacement, although the adjustable parameters may vary depending upon the application concerned.

A known prior art optical fibre connector is shown in FIG. 1. It comprises a cylindrical tube 1 which can receive a lens barrel 2 in use. The tube has two pairs of adjustment screws 3a, 3b and 4a, 4b, which extend through the tube and can engage the outer surface of the lens barrel once it has been inserted for adjusting the position of the lens barrel within the tube. An adjustable spring 5 is provided in an opposed relationship to the screws 3a, 3b, 4a, 4b to resiliently bias the lens barrel into engagement with the tips of the adjustment screws. The connector can be fixed to the optical component, laser source, etc., to which the optical fibre 6 is to be coupled by means of a flange 7. In use, the lens barrel is inserted into the tube 1, and the spring 5 adjusted to resiliently bias it against the adjustment screws 3a, 3b, 4a, 4b. The screws 3a and 4a, or 3b and 4b can then be moved together to move the lens barrel laterally (i.e. in a plane perpendicular to the axis of the lens barrel), or the screws 3a and 3b, or 4a and 4b can be moved together to tilt the lens barrel, in order to align the lens and optical fibre with the laser source, optical component, etc.

The Applicants have already proposed an improved version of this type of prior art connector in their UK Patent No. 2325058 which, inter alia, helps to avoid crosstalk between adjustment movements of the adjustment screws of the connector and facilitates more consistent rotational orientation of the lens barrel in the connector (with respect to rotation about its longitudinal axis).

However, the Applicants have now recognised that another important factor affecting the coupling efficiency and operation, etc., when coupling electromagnetic radiation into and out of optical fibres is the polarisation state of the radiation. This is because many optical systems are polarisation sensitive and may in particular require highly plane polarised radiation to operate properly or efficiently. For example, an optical system may include polarisation sensitive materials, such as coatings on components such as lenses. In such a system, if the incident radiation is not highly plane polarised and appropriately aligned with, e.g., the polarisation axis of the polarisation sensitive component, then that could lead to transmission losses and possibly localised heating.

It can also be the case that materials being tested in an optical system can be polarisation sensitive (such that insufficiently plane polarised radiation and incorrect polarisation alignment can lead to inaccurate measurements) or indeed that the type of measurement itself is polarisation sensitive (e.g. where a scattering detection is being made at 90E to the incident radiation's direction of travel).

In such polarisation sensitive systems it is desirable therefore to try to ensure that the electromagnetic radiation exiting an optical fibre (and then, e.g., entering a polarisation sensitive component of the system) exhibits a high degree of (plane) polarisation (i.e. has a high extinction ratio, typically better than 100:1). One way to achieve this would be to use so-called polarising optical fibres which only emit plane polarised light (regardless of the incident radiation entering them). However, such fibres are difficult to manufacture and hence can be expensive and difficult to obtain.

It is also known to use polarisation maintaining optical fibres. These fibres are birefringent, and have two (orthogonal) polarisation axes, a so-called "fast" axis and a "slow" axis. If they receive incident plane polarised electromagnetic radiation that is accurately aligned with one of their polarisation axes (in practice usually the slow axis, although the fast axis can be used), polarisation maintaining optical fibres will maintain the plane polarisation of the incident radiation and emit plane polarised electromagnetic radiation. Thus, by using plane polarised incident radiation and a polarisation maintaining optical fibre, plane polarised output radiation can be delivered to optical components of an optical system. As lasers typically emit plane polarised electromagnetic radiation light, the use of polarisation maintaining fibres in combination with lasers is in fact a convenient way of delivering plane polarised radiation in an optical system.

However, the Applicants have recognised that a problem with this type of arrangement is that the polarisation axis of the incident plane polarised radiation (e.g. from the laser) must be accurately aligned with the polarisation axis of the polarisation maintaining optical fibre, or otherwise the polarisation of the exiting radiation can become unstable and can fluctuate in use depending on, e.g., environmental conditions. This can have the effect, e.g., that the exiting radiation is no longer highly plane polarised.

The reason for this is that the birefringent polarisation maintaining optical fibre can accept orthogonal polarisation planes and so if the incident radiation is not accurately aligned with one or other orthogonal axis of the optical fibre, the radiation will in fact travel down the optical fibre as two orthogonal components. This may not be a problem where the orthogonal components are in phase when they exit the fibre (and so interfere constructively on exiting the fibre), but if a phase difference between the orthogonal components is present as the components exit the fibre, then the polarisation state of the exiting radiation will no longer be highly plane polarised, but will only be partially polarised (and exhibit a lower extinction ratio).

The phase difference, if any, as the orthogonal components exit the fibre depends, inter alia, on the length of the fibre (because each component travels a different refractive index path (and hence effective path length) through the fibre). Thus only certain fibre lengths will ensure that the two components are brought to the same phase as they exit the fibre. Furthermore, the effective refractive index and path length encountered by each orthogonal component can also be affected by e.g., environmental factors such as stresses or temperature changes in the fibre, which factors may furthermore affect the effective refractive index and path length encountered by each orthogonal component differently. Thus even if the fibre length is selected such that the orthogonal components should exit fibre in phase, environmental factors can introduce (effectively random) phase differences that will alter the phase relationship.

The effect of this overall is that when using polarisation maintaining optical fibres, unless the plane of the incident polarised electromagnetic radiation (light) is accurately aligned with a polarisation axis of the polarisation maintaining optical fibre, then the polarisation of the radiation exiting the fibre can be unstable (such that, e.g., the extinction ratio can vary) and can change with, e.g., environmental factors.

It can be important therefore in polarisation sensitive optical systems that use polarisation maintaining optical fibres to ensure accurate alignment between incident plane polarised radiation and the polarisation axis of the polarisation maintaining optical fibre. This essentially means that the rotational alignment of the optical fibre (with respect to rotation about its optical axis) must be set accurately in relation to the optical axis of the incident radiation.

As discussed above, existing optical fibre connectors and in particular the Applicant's connector described in their UK Patent No. 2325058 can help to achieve more accurate rotational alignment (and hence polarisation alignment) between an optical fibre and, e.g., a laser source. However, the Applicants have found that even with such connectors sufficiently accurate polarisation alignment can still be difficult to achieve.

For example, when fixing the connector to the laser source it can be difficult to ensure reliable alignment between, e.g., a reference axis of the connector and the polarisation axis of the laser radiation. This may be due to, e.g., tolerances in the fixings (e.g., flange and screws) used to fix the connector to the laser source and/or misalignment between the fixing points for the connector provided on the laser itself and the polarisation axis of the laser radiation. While it may then be possible in use to adjust the rotational orientation of an optical fibre in the connector to achieve correct alignment of the polarisation axes of the laser beam and optical fibre, such adjustment can be time consuming and difficult to do and may have to be repeated every time a fibre is placed in the connector (even if the alignment of the connector to the laser remains unchanged). It may also be necessary to carry out such adjustments every time the connector is connected to a different laser.

SUMMARY OF THE INVENTION

According to a first aspect of the present invention, there is provided a connector system for coupling an optical fibre assembly to an optical component, comprising:

a body having a throughbore adapted to receive an optical fibre assembly in use; and a polarising element for polarising electromagnetic radiation that passes through it located in the throughbore such that electromagnetic radiation passing through the throughbore will pass through the polarising element. The connector system of the present invention includes a polarising element that will polarise electromagnetic radiation (e.g. light) that passes through it located in the connector body's throughbore. This means that incident radiation passing through the throughbore of the connector body will pass via the polarising element and thereby be plane polarised, regardless of its initial polarisation state. This ensures that plane polarised light of a consistent orientation (polarisation axis) can always be delivered to an optical fibre that is inserted into the connector, regardless of the properties or polarisation state of the electromagnetic radiation (light) entering the connector (e.g. from a laser source to which the connector is coupled). Thus, for example, light having the same polarisation axis would be output even when used on different laser sources whose output light polarisation axes differ.

The connector of the present invention can therefore be used to provide a consistent polarisation axis even when used with different laser sources and can therefore avoid the need to, e.g., adjust the connector's orientation with respect to a laser source to achieve satisfactory plane polarised output radiation.

The polarising element can be any suitable such element that will provide plane polarised radiation. The unwanted incident radiation components can, for example, be rejected by the polarising element deviating those components from the desired path (e.g. straight-through transmission), by, for example, reflecting them or otherwise altering their path. Alternatively, the polarising element could reject the unwanted components of the incident radiation by, for example, absorbing those components. The polarising element could, for example, be an element that will transmit (in the direction of the incident radiation) one plane of polarisation only, such as a dielectric-coated cube beam splitter, or be an element, such as a birefringent material, that while transmitting the two polarisation components will separate them spatially (e.g. by deviating one from a given path) so that one component can be rejected.

In a particularly preferred embodiment, the polarising element provides plane polarised output radiation by deviating (e.g. reflecting) the unwanted radiation components. This is preferred because it avoids localised heating of the polarising element due to the unwanted radiation components (which could occur when, e.g., those components are rejected by the polarising element absorbing them). Preferably in this arrangement the connector is provided with a heat dump to which the rejected radiation components can be deviated (e.g. reflected).

The polarisation axis of the polarising element (i.e., the axis of the radiation component transmitted in the desired direction (e.g. straight through in the direction of the incident radiation) and not rejected by the polarising element) can preferably be determined from a visual inspection of the connector. Most preferably the polarisation axis of the polarising element is indicated on the connector, e.g., by an appropriate marking on the connector body and/or by aligning it with other features or reference surfaces, etc., of the connector. In a particularly preferred embodiment, the (transmission) polarisation axis of the polarising element is aligned, preferably in a fixed manner, with respect to fixings provided on the connector for fixing the connector to another component, such as a laser. This facilitates alignment of the polarisation axis of the polarising element with the polarisation axis of the incident radiation such as light emitted by a laser source to which the connector is to be fixed.

In one preferred embodiment, the polarising element and connector body are arranged such that it is possible to adjust in use the alignment of the polarising element in the connector throughbore relative to an external component. This would allow, e.g., the alignment between the incident radiation and the polarising element (e.g. the alignment of the polarisation axis of the polarising element relative to the incident radiation (e.g. laser source)) to be adjusted. Preferably such adjustment can be carried out by rotating the polarising element about the longitudinal axis of the connector system's body's throughbore. This could be done, e.g., by rotating the entire connector body about that axis, by rotating a part of the connector system that carries the polarising element, or by rotating the polarising element alone.

Such adjustments may be desirable to help to avoid, e.g., power losses that could arise due to misalignment between the polarisation axes of the incident radiation and the polarising element (since as only the component of the incident radiation aligned with the (through-transmission) plane of polarisation of the polarising element will pass through the polarising element, then if the incident radiation is not plane polarised and with its plane of polarisation aligned with that plane of polarisation of the polarising element, there will be some transmission power loss through the polarising element due to the rejected component(s) of the incident radiation).

Where such alignment is being carried out, then it could be done, e.g., by rotating the polarising element relative to optical axis of the incident radiation until the rotational position providing maximum power transmission is identified. This provides a relatively straightforward way of identifying the "correct" rotational alignment, since as discussed above, polarisation misalignment with respect to the incident radiation tends to lead to transmission power losses.

That said, the Applicants believe that in practice with a laser source and connector having appropriately aligned fixings and with a polarising element appropriately fixedly aligned to those fixings, then any potential misalignment due to, e.g., fixing tolerances, is likely to be sufficiently small that any transmission power losses should be tolerable in use even without the ability to further adjust the polarisation alignment and outweighed by the advantages of the radiation transmitted by the polarising element being substantially completely plane polarised and in a consistent plane of polarisation.

Thus, in a particularly preferred embodiment, the polarising element is arranged in a fixed relationship relative to fixings provided in the connector body for fixing the connector to another component.

The optical fibre assembly could comprise an optical fibre alone or could include other optical elements such as a lens. Preferably the assembly is a lens barrel or tube, comprising a hollow (preferably cylindrical) tube holding a lens and optical fibre in a fixed, prealigned relationship. The optical fibre assembly could include any form of optical fibre, although in a particularly preferred embodiment the optical fibre is a polarisation maintaining optical fibre, since as discussed above, the present invention will be particularly applicable to systems using polarisation maintaining optical fibres.

The polarising element can be mounted and arranged as desired so long as it will be appropriately located in the connector system's body's throughbore in use. In one preferred embodiment, the polarising element is mounted in and carried by the optical fibre assembly itself, for example in the cylindrical tube of a lens barrel or tube.

An advantage of mounting the polarising element in the optical fibre assembly is that the polarising element and optical fibre can be aligned and fixed in place when the lens tube (e.g.) is first constructed, thereby removing any need for the optical fibre to be aligned with the polarising element when the optical fibre assembly is inserted in a connector body. Such an optical fibre assembly could also be used in existing connector system bodies to provide them with a polarising element arrangement in accordance with the present invention.

It is believed that this arrangement may be new and advantageous in its own right. Thus, according to a second aspect of the present invention, there is provided an optical fibre assembly comprising:

a hollow tube having a throughbore;

a polarising element mounted in the throughbore for polarising electromagnetic radiation passing through the throughbore; and an optical fibre mounted in the throughbore.

As discussed above, the optical fibre assembly will also typically include a lens mounted in the throughbore for focussing radiation onto the end of the optical fibre.

The lens is preferably mounted between the optical fibre and the polarising element. The optical fibre, polarising element and lens (if any) are preferably fixedly secured in the throughbore so that their positions cannot be adjusted in use. Preferably only the fibre, polarising element and lens (if present) and nothing else are mounted in the throughbore. In another preferred embodiment, the polarising element is not mounted in the optical fibre assembly, but is separate therefrom and mounted (preferably fixedly) in the connector body or another component that is or can be carried in the connector body.

This allows the optical fibre assembly to be removed from the connector whilst leaving the polarising element in the connector and thus provides a connector system that can be used with existing optical fibre assemblies (e.g. lens tubes) but still include a polarising element in accordance with the present invention. In such an arrangement, the polarising element is, as discussed above, preferably fixed in a particular alignment (e.g., rotational alignment) relative to the connector body, as that facilitates polarisation alignment between the polarising element and, e.g., the incident radiation and/or an optical fibre assembly.

It will be appreciated that in this type of arrangement, particularly where the connector is to be used with different optical fibre assemblies, then it may be necessary or desirable to align an inserted optical fibre assembly appropriately with the polarising element in the connector body's throughbore. This could be the case, e.g., where the optical fibre being used is a polarisation maintaining optical fibre and polarisation stable light delivery is required. In such a case, as discussed above, it may be desirable to align one polarisation axis of the polarisation maintaining optical fibre with the (through-transmission) polarisation axis of the polarising element—this would typically be the "slow" axis of the fibre, but could be the "fast" axis of the fibre if desired.

Such alignment will, as discussed above, typically involve rotating the optical fibre assembly relative to the polarising element in the connector system's throughbore until a desired output condition (e.g. polarisation stability and maximum extinction ratio, as discussed above) is achieved. Thus in a preferred embodiment, in order to facilitate such alignment, the connector is arranged such that the polarising element's polarisation axis (i.e. the axis of plane polarised light it allows to pass through the throughbore) can be identified from the connector. This could be done by, e.g., aligning the polarising element's polarisation axis with, e.g., reference marks or surfaces on the connector.

In one arrangement of this embodiment, once the rotational orientation of the optical fibre assembly with respect to the polarising element has been set, the optical fibre assembly and polarising element could be fixed in place in that relative orientation, e.g. by gluing or otherwise fixing the optical fibre assembly using, e.g., grub screws, in a fixed positional relationship to the polarising element.

However, in a particularly preferred embodiment of the present invention, the optical fibre assembly is removably retained in the connector body such that it can be repeatedly removed therefrom and reinserted therein. However, such an arrangement may mean that an optical fibre assembly would need to be realigned with the polarising element in the connector's throughbore each time the optical fibre assembly is removed and reinserted.

Thus, in a particularly preferred embodiment of this arrangement, the connector system is arranged such that one or more discrete rotational orientations of an optical fibre assembly within the connector's throughbore can be identified and arranged. This would allow the rotational orientation of an optical fibre assembly within the connector system's throughbore to be more reliably repeated upon, e.g., removal and reinsertion of an optical fibre assembly. Preferably the arrangement is such that only a single rotational orientation can be so identified and arranged. The indication and fixing of such discrete rotational orientations can be achieved as desired. Preferably, the connector system is provided with, for example, keying means such as surfaces or lands that mean that one or more (and preferably only one) discrete orientations with respect to rotation about the connector system's throughbore's longitudinal axis can be readily identified and the optical fibre assembly accordingly placed in those orientations or that orientation.

Thus in a particularly preferred embodiment, the optical fibre assembly and connector system can be arranged such that the optical fibre assembly can be inserted in the connector system's throughbore in one particular orientation with respect to rotation about the longitudinal axis of the throughbore of the connector system and such that when inserted in that orientation, the optical fibre assembly can be or is then fixed against rotation about its longitudinal axis in the throughbore. This arrangement means that the optical fibre assembly can always be inserted in the connector throughbore with the same orientation with respect to rotation about its longitudinal axis (and thus with respect to the polarising element mounted in the throughbore), thereby helping to ensure reliably repeatable rotational orientation of the optical fibre assembly in the connector system throughbore even when the optical fibre assembly is repeatedly removed from and reinserted in the connector throughbore.

In a particularly preferred such embodiment, the optical fibre assembly and connector system body are arranged such that they will mate in one particular rotational orientation only. This could be achieved by providing, e.g., a key on either the optical fibre assembly or connector body and a corresponding slot on the connector body or optical fibre assembly, respectively, for receiving the key.

In a particularly preferred embodiment, the arrangement, e.g. mating arrangement, is such that the rotational orientation of an inserted optical fibre assembly can be adjusted, but then the relative rotational position of the optical fibre assembly about the longitudinal axis of the connector throughbore can be fixed (for future insertions of the optical fibre assembly). This would allow an optical fibre assembly's rotational orientation within the connector body and relative to the polarising element to be adjusted and aligned when the optical fibre assembly is first inserted in the connector body, but then the relative rotational positions fixed for future insertions of the optical fibre assembly.

Thus, preferably, the connector system comprises a separable keying means which mates with the connector body in a fixed orientation with respect to rotation about the longitudinal axis of the connector body throughbore, which keying means is securable to an optical fibre assembly.

In use of this embodiment, an optical fibre assembly would be inserted in the connector body and be rotationally aligned as desired, and then, while maintaining the rotational alignment between the separable keying means and optical fibre assembly, the keying means would be secured to the optical fibre assembly. The optical fibre assembly and the keying means secured to it can then be subsequently removed and reinserted into the connector body, with the assurance that the optical fibre assembly will be in the same rotational orientation when the keying means is mated with the connector body. This arrangement thus ensures that the optical fibre assembly can be removed and reinserted in the connector body without loss of rotational alignment and hence, e.g., polarisation alignment relative to the polarising element mounted in the connector body's throughbore.

The separable keying means can be secured to the optical fibre assembly by any suitable means, such as grub screws. It can be arranged to mate with the connector body in a predetermined rotational alignment by any suitable means, such as the connector body or keying means including a pin which engages a slot or hole in the keying means or connector body, respectively.

The keying means can also preferably be used to fix the position of the optical fibre assembly along the longitudinal axis of the connector body, for example by securing it to the optical fibre assembly at an appropriate point along the length thereof.

In a particularly preferred embodiment, the separable keying means is in the form of a separable collar that can be secured to an optical fibre assembly.

As well as, as discussed above, being able to adjust and preferably then fix the rotational alignment of an inserted optical fibre assembly about the longitudinal axis of the connector's throughbore, it may also be desirable to make other adjustments to the position of an optical fibre assembly in the connector, such as to its lateral position in the throughbore. Thus, in a particularly preferred embodiment, the connector system further includes means for adjusting the lateral position of the optical fibre assembly within the connector body throughbore. Preferably the optical fibre assembly can be moved in a direction perpendicular to the longitudinal axis of the throughbore, and/or the tilt of the longitudinal axis of the optical fibre assembly relative to the longitudinal axis of the connector system's throughbore can be adjusted.

The connector system thus preferably comprises a manipulator means that provides the main connector system body and has a throughbore for receiving (preferably removably) the optical fibre assembly, which manipulator means includes one or more adjustors or adjustment means that are adjustable by a user to move an inserted optical fibre assembly relative to the manipulator means (i.e. connector body) in a direction perpendicular to the longitudinal axis of the connector body throughbore. The adjustment means are preferably arranged such that they can be used to adjust the tilt of the longitudinal axis of the optical fibre assembly relative to the longitudinal axis of the connector body's throughbore.

Thus, according to a third aspect of the present invention, there is provided an adjustable connector system for coupling an optical fibre assembly to an optical component, comprising:

a manipulator means having a body having a throughbore adapted to receive an optical fibre assembly in use, the manipulator means further including one or more adjustment means which are adjustable by a user to move an optical fibre assembly inserted in the manipulator means throughbore relative to the manipulator means in a direction perpendicular to the longitudinal axis of the manipulator means throughbore; and a polarising element for polarising electromagnetic radiation that passes through it located in the manipulator means throughbore such that electromagnetic radiation passing through the throughbore will pass through the polarising element.

As discussed above, in these aspects and embodiments of the invention, the connector and manipulator means preferably removably receive the optical fibre assembly, and the polarising element can be mounted in the optical fibre assembly itself, or in the manipulator means (or another component that can be carried by the manipulator means).

The adjustment means can be any suitable such means, such as screws which can be arranged to penetrate the connector body (manipulator means) wall into the throughbore, as in the prior art connectors described above, or other devices which would allow manipulation of an inserted optical fibre assembly, such as piezo electric devices.

The number and exact arrangement of the adjustment means will depend upon the parameters desired to be adjustable. Preferably at least two adjustment means are provided. This makes tilt adjustment easier. The adjustment means could, for example, be arranged as in the prior art connectors discussed above.

For example, at least a pair of substantially mutually orthogonal and/or a pair of longitudinally spaced, adjustment means could be provided. Alternatively, two pairs of substantially mutually orthogonal, preferably spaced apart, adjustment means could be provided, the adjustment means of each pair being at the same longitudinal position along the length of the connector body (manipulator means), and the two pairs being spaced apart from one another along the length of the throughbore in the connector body (manipulator means).

Where the adjustment means can displace an inserted optical fibre assembly in two directions perpendicular to the longitudinal axis of the connector body (manipulator means) (for example if lateral and/or tilt adjustment in two directions is desired), then the displacement directions are preferably arranged to be orthogonal to each other and, more preferably, to lie in a plane perpendicular to the longitudinal axis of the connector body (manipulator means) throughbore. This avoids crosstalk between the displacement directions.

The adjustment means preferably engage any surface that they act on at discrete points, rather than over extended portions of their surfaces. This helps the accuracy of the adjustment and engagement. The adjustment means can have, for example, spherical contact surfaces.

The adjustment means could act directly on an inserted optical fibre assembly. However, in a particularly preferred embodiment, the optical fibre connector system of the present invention further includes a separate carrier means that receives the optical fibre assembly and upon which adjustment means act. This separate carrier means preferably has a body having a throughbore adapted to receive the optical fibre assembly in use, and can be inserted into the connector system's throughbore such that the adjustment means are then engageable against the outer surface of the carrier means so as to move the carrier means (and hence an optical fibre assembly inserted in the carrier means) relative to the connector body in a direction perpendicular to the longitudinal axis of the connector body throughbore. The use of a separate carrier means, inter alia, facilitates the adjustment and alignment of an optical fibre assembly in the connector.

In a particularly preferred embodiment, the carrier means is a hollow tube or sleeve, and can float within the connector body throughbore and receive, preferably removably, an optical fibre assembly (such as a lens tube or lens barrel) in use.

Thus, according to a fourth aspect of the present invention, there is provided an adjustable connector system for coupling an optical fibre assembly to an optical component, comprising:

a carrier means having a body having a throughbore adapted to receive an optical fibre assembly in use; and a manipulator means having a body having a throughbore adapted to receive removably the carrier means and optical fibre assembly in use, the manipulator means further including one or more adjustment means which are engageable against the outer surface of the carrier means when it is inserted in the manipulator means throughbore and are adjustable by a user to then move the carrier means relative to the manipulator means in a direction perpendicular to the longitudinal axis of the manipulator means throughbore;

the system further being arranged such that when an optical fibre assembly is inserted in the carrier means movement of said adjustment means to effect movement of said carrier means relative to the manipulator means causes corresponding movement of the optical fibre assembly relative to the manipulator means; and the system further comprising a polarising element for polarising electromagnetic radiation that passes through it located in the throughbore such that electromagnetic radiation passing through the manipulator means throughbore will pass through the polarising element.

Where a carrier means is provided then the polarising element could be mounted in the carrier means (or it could be mounted in the manipulator means or the optical fibre assembly, as discussed above).

It is believed that the use of a carrier adapted to receive an optical fibre assembly and mounting a polarising element is in itself advantageous, since such a carrier could then be used with already existing adjustable connectors.

Thus according to a fifth aspect of the present invention, there is provided a carrier for an optical fibre assembly, comprising a body having a throughbore adapted to receive an optical fibre assembly, and a polarising element mounted in the throughbore.

As discussed above, it is preferred for the connector system to be arranged such that one or more desirable rotational orientations for an inserted optical fibre assembly can be easily identified and arranged. This also applies where the connector system includes a separable carrier means, since, for example, it may be desirable to ensure reliable rotational orientation of the carrier means in relation to the connector body where, for example, the carrier means carries the polarising element.

Where the connector system includes adjustment means, such rotational alignment can be provided by including one or more lands on the outer surface of the optical fibre assembly (where the adjustment means engage the optical fibre assembly), or on the outer surface of the carrier means (where the adjustment means engage the carrier means), arranged such that the optical fibre assembly or carrier means, respectively, can be inserted into the connector body (manipulator means) in such a way that the adjustment means will in use engage only the lands. The lands can be (and preferably are) further arranged such that the optical fibre assembly or carrier means can only be so inserted into the connector body (manipulator means) in one or more discrete orientations with respect to rotation about the longitudinal axis of the connector body (manipulator means) throughbore. This allows the rotational orientation of the optical fibre assembly or carrier means, respectively, with respect to the manipulator means in use to be fixed and reproduced reliably by inserting the optical fibre assembly, or carrier means, such that the adjustment means for laterally displacing the optical fibre assembly or carrier means engage only the lands on the outer surface of the optical fibre assembly (or carrier means, as appropriate).

Preferably the arrangement is such that the optical fibre assembly or carrier means, respectively, can only be so inserted in a single rotational orientation.

In a particularly preferred such embodiment, the lands that the adjustment means engage are planar. Using planar, flat surfaces for the lands helps to avoid crosstalk between the different adjustment means (which could occur, e.g., if the adjustment means act on a curved surface).

Thus, according to a sixth aspect of the present invention, there is provided a carrier for an optical fibre assembly, comprising: a body having a throughbore adapted to receive an optical fibre assembly in use; and a polarising element mounted in the throughbore; the body further having one or more substantially planar lands on its outer surface surrounding the throughbore.

In these embodiments and aspects of the invention, the plane of the lands preferably includes the line extending in a direction perpendicular to the longitudinal axis of the connector body (manipulator means) throughbore and lying in a plane perpendicular to the direction of motion of the respective adjustment means. In a particularly preferred arrangement, the lands lie in the plane perpendicular to the direction of motion of the respective adjustment means, and, more preferably, also in a plane parallel to the longitudinal axis of the connector body throughbore.

Each adjustment means could engage a single, or more than one land. For example, each adjustment means could engage a pair of lands formed into a v-cross section groove. A single land could also be engaged by more than one adjustment means. Preferably each adjustment means engages a different land to the other adjustment means.

The location and arrangement of the lands on the optical fibre assembly or carrier means should be such that they can be aligned with the adjustment means of the connector in use in such a way that the adjustment means only engage the lands, and will thus depend upon the actual arrangement of the adjustment means on the connector.

For example, a carrier means to be used in conjunction with connectors similar to the prior art connectors referred to above could have at least a pair of substantially mutually orthogonal substantially planar, flat lands on its outer surface arranged at the same place along the length of the carrier means and extending for the same distance along the length of the throughbore in the carrier means. Alternatively, two pairs of substantially mutually orthogonal, preferably spaced apart, flat lands could be provided, the flat lands of each pair being at the same longitudinal position along the length of the carrier means, and the two pairs being spaced apart from one another along the length of the throughbore in the carrier means.

The lands themselves can be formed directly in the outer surface of the optical fibre assembly or carrier means (for example by appropriate machining of the carrier means surface), or be in the form of separate components fixed on the surface thereof. In a particularly preferred arrangement, the lands comprise flat pads inserted into the body of the optical fibre assembly or carrier means.

The lands are preferably sufficiently hard to resist deformation in use. They can, for example, be of hardened steel or ceramic.

The surface of the optical fibre assembly or carrier means away from the lands need not be flat. The optical fibre assembly or carrier means could, for example, comprise a cylindrical tube having flat lands on its outer surface. In such an arrangement, the planes of the lands are most preferably perpendicular to respective radii of the cylinder.

In these embodiments, the lands can also be arranged to fix the point about which the optical fibre assembly or carrier means pivots when its tilt relative to the connector body (manipulator means) is adjusted. For example, in the case where the optical fibre assembly includes both an optical fibre and another optical element such as a lens (such as in a lens barrel), the lands could be positioned at the same longitudinal position as the optical element to allow optical fibre assembly to be pivoted about the optical element when adjusting its tilt in use.

The lands on the optical fibre assembly or carrier means could also be used to fix the position of the optical fibre assembly or carrier means, respectively, along the longitudinal axis of the connector body (e.g. manipulator means) throughbore. For example, the lands could be arranged to form v-cross-section grooves extending perpendicular to the longitudinal axis of the optical fibre assembly or carrier means throughbore, such that the adjustment means can be arranged to engage the grooves and thereby ensure that the optical fibre assembly or carrier means returns to and remains fixed in the same position along the length of the connector body (e.g. manipulator means) in use.

Where a carrier means is provided, the optical fibre assembly could be secured to the carrier means such that it cannot be removed from the connector body (e.g. manipulator means) independently of the carrier means. In such an arrangement, the carrier means itself could include means for securing the fibre thereto once it has been inserted therein. The optical fibre assembly could be secured to the carrier means by, for example, adhering it thereto, or by gripping it with screws mounted on the carrier means.

However, as discussed above, in a particularly preferred embodiment, the optical fibre assembly is releasably retained in the carrier means when it is inserted therein, such that it can be repeatedly removed from and reinserted in the carrier means, without the need to remove the carrier means from the connector body (e.g. manipulator means). The carrier means could, for example, include means such a spring, for releasably resiliently retaining the optical fibre assembly when it is inserted therein.

Alternatively, the main connector body (e.g. manipulator means) could include means for releasably retaining the optical fibre assembly in the carrier means (and thus in the connector body) when the carrier means and optical fibre assembly are inserted in the connector body. The connector body (e.g. manipulator means) could, for example, include a screw which can penetrate through the wall of the carrier means to act on the optical fibre assembly to hold it against the carrier means such that it is retained.

In these arrangements where the connector body (e.g. manipulator means) includes means for releasably retaining the optical fibre assembly in the carrier means, then the carrier means can include one or more through holes to allow the retaining means to penetrate into the throughbore of the carrier means and thereby engage the optical fibre assembly when it is inserted therein. These through holes are preferably generally opposed to the lands on the surface of the carrier means (if provided). This facilitates, for example, the use of the resiliently biassing means to retain the optical fibre assembly in the carrier means in use.

It is believed that the use of a connector with a carrier for an optical fibre assembly in which a polarising element is provided and in which the optical fibre assembly can be removed from the connector independently of the carrier may be advantageous generally, and even in connectors where adjustment of the position of the optical fibre assembly within the connector is not desired or not possible, in that the same carrier and connector assembly can then be used for different optical fibre assemblies.

Thus, according to a seventh aspect of the present invention, there is provided a connector system for connecting an optical fibre assembly to an optical component, comprising:
 a carrier means having a body having a throughbore for receiving the optical fibre assembly;

a connector mount comprising a body having a throughbore for receiving the carrier means and optical fibre assembly;

means for retaining the optical fibre assembly, carrier means and connector mount in a fixed relationship to each other when the optical fibre assembly and carrier means are inserted in the connector mount in such a manner that the optical fibre assembly is removable from the connector mount independently of the carrier means once it has been inserted therein; and a polarising element located in the connector mount throughbore.

As discussed above, in this arrangement the polarising element can be mounted as desired, but preferably is mounted either in or on the carrier means or in or on the connector mount.

Where the optical fibre assembly is removable from the carrier means without the need to remove the carrier means as well from the connector body (e.g. manipulator means), then the carrier means is preferably retained in its position in the connector body (e.g. manipulator means) once the optical fibre assembly has been removed. This could be achieved by, for example, suitable springs or magnets being located on the carrier means and/or connector body (e.g. manipulator means). This avoids the problem of the carrier means falling out of the connector body (e.g. manipulator means), and can also help to ensure that the lands on the surface of the carrier means and the adjustment means of the manipulator means remain aligned, once the optical fibre assembly has been removed.

The provision of a carrier means that can remain in the connector body (e.g. manipulator means) while the optical fibre assembly is removed therefrom has a number of advantages. Firstly, the carrier means can, e.g., remain in the manipulator means with its lands aligned with the adjustment means of the manipulator means, such that removal and subsequent reinsertion of the optical fibre assembly does not then require realignment of the lands with the adjustment means.

Furthermore, a single such carrier means can then be used with multiple optical fibre assemblies without the need for the optical fibre assemblies to be specially constructed to have their own lands. Thus such a construction can, for example, be used with existing optical fibre assemblies such as the lens barrel described above. This arrangement also avoids, for example, the need to produce and assemble such lens barrels having lands on their outer surfaces.

Where provided, the carrier means and optical fibre assembly preferably engage in use only at discrete contact points, rather than across a substantial area of their facing surfaces. This arrangement means the optical fibre assembly only ever contacts the carrier means in use at the same, well defined reference points on the carrier means. The carrier means and optical fibre assembly thus cooperate in use according to kinematic principles. This helps to enable accurate adjustment of the optical fibre assembly, and to ensure that there is good reproducibility of alignment and engagement when refitting the optical fibre assembly in the carrier means, thus reducing the need for subsequent readjustment when the optical fibre assembly is removed and refitted following its initial alignment.

To achieve this point contact, the carrier means can include a number of studs arranged to stand proud of the surface of the throughbore such that these studs alone will engage the optical fibre assembly when it is inserted in the carrier means.

Where the carrier means is provided with lands for adjustment means to engage, the contact points in the throughbore of the carrier means preferably lie along the same line pointing towards the central longitudinal axis of the carrier means throughbore as the lands which the adjustment means engage. This helps to avoid bending of the carrier means due to misalignment between the lands on its outer surface and the contact points on its inner surface. In the preferred arrangements where the lands are in the form of pads inserted into the body of the carrier means, this can be achieved by providing the pads with suitable studs on the sides opposed to their flat surfaces.

As discussed above, it is particularly preferred to be able to reliably fix the rotational orientation of the optical fibre assembly in the connector system. Where a separate carrier means that receives the optical fibre assembly is provided, such alignment is preferably achieved by allowing the rotational orientation of the carrier means in the connector body to be fixed, preferably by having, as discussed above, preferably planar, lands with which the adjustment means of the manipulator means engage appropriately located and orientated on the carrier means such that the lands will only align properly with the adjustment means of the manipulator in one particular orientation with respect to the rotation about the longitudinal axis of the throughbore of the carrier means, and then locating the optical fibre assembly in the carrier means such that it is fixed against rotation about its longitudinal axis in the carrier means.

This allows the carrier means and connector body (e.g. manipulator means) to be relatively easily arranged such that the carrier means always has the same orientation with respect to rotation about its longitudinal axis when inserted in the connector body (manipulator means). As the optical fibre assembly is then fixed against rotation about its longitudinal axis in the carrier means, the rotational orientation of the optical fibre assembly in the connector body (manipulator means) (and thus with respect to the connector system and e.g. the polarising element in it) can then be fixed. Thus, by appropriate fixing of the optical fibre assembly to the carrier means and orientation of the lands of the carrier means, the desired rotational alignment can be achieved and ensured.

It would be possible to secure the optical fibre assembly in the carrier means in a fixed rotational orientation by appropriately aligning it within the carrier (and, e.g., to the lands thereon) and then securing it thereto. However, when it is desired that the optical fibre assembly can be removed from the connector body (e.g. manipulator means) independently of the carrier means, then the arrangement is preferably such that the optical fibre assembly can be inserted in the carrier means in a particular rotational orientation with respect to rotation about the longitudinal axis of the throughbore (and preferably in only a single such rotational orientation) and when so inserted is restrained from rotating relative to the carrier means about its longitudinal axis.

Such an arrangement is preferably achieved, as discussed above in relation to rotation within the connector body in general, by providing an appropriate keying arrangement on the carrier means and optical fibre assembly. Thus most preferably, the carrier means further comprises a separable keying means, preferably in the form of a collar, which mates in a fixed orientation with respect to rotation about the longitudinal axis of the carrier means throughbore with the carrier means body, which keying means is securable to the optical fibre assembly.

In this arrangement as discussed above, the optical fibre assembly can be inserted in the carrier means and can then be rotationally aligned as desired while the carrier means is inserted in the manipulator means, and then, while maintaining the rotational alignment between the keying means and optical fibre assembly, the keying means can be secured to the optical fibre assembly. The optical fibre assembly and the keying means secured to it can then be subsequently removed and reinserted into the carrier means while the carrier means body remains in the connector body (e.g. manipulator means), with the assurance that the optical fibre assembly will be in the correct rotational orientation when the keying means (e.g. collar) is mated with the carrier means body in the connector body (manipulator means). This arrangement thus ensures that the optical fibre assembly can be removed and reinserted in the carrier means without loss of rotational alignment.

This arrangement will allow, e.g., the optical fibre assembly to be removed from the carrier means and the connector body (manipulator means) and reinserted therein without the loss of polarisation alignment or the need for subsequent rotational realignment. It is also advantageous because it permits the rotational alignment to be adjusted and fixed after (and without loss of) tilt (and less importantly lateral) alignment adjustments. This is important because rotational alignments would normally be done last as light through the fibre is often required for this, but if such rotation changed the tilt, light transmission could be lost.

It is believed that the use of a carrier means mounting a polarising element and comprising a collar and main body which can be used to ensure reproducibility of the rotational orientation of an optical fibre assembly with respect of the carrier means body even when the assembly is removed and reinserted therein may be new and advantageous in its own right.

Thus, according to an eighth aspect of the present invention, there is provided a carrier for an optical fibre assembly, comprising:

a body having throughbore for removably receiving the optical fibre assembly;

a polarising element mounted in the throughbore; and a separable collar which mates with the body in a fixed orientation with respect to rotation about the longitudinal axis of the throughbore, the collar being adapted to be securable to an optical fibre assembly such that while it is so secured it remains in a fixed orientation with respect to rotation about the longitudinal axis of the optical fibre assembly.

Again, the separable keying means, e.g., collar, can be secured to the optical fibre assembly by any suitable means, such as grub screws. It can be arranged to mate with the carrier means body in a predetermined rotational alignment by any suitable means, such as the carrier body or keying means including a pin which engages a slot or hole in the keying means or carrier body, respectively.

The separable keying means can preferably also be used to fix the position of the optical fibre assembly along the longitudinal axis of the carrier means body, e.g. by securing it to the optical fibre assembly at an appropriate point along the length thereof. This can be used to, for example, ensure that when the optical fibre assembly with the keying means secured to it is inserted into the carrier means body such that when the keying means and carrier means body mate, the lands of the carrier means are positioned about the point along the optical fibre assembly (such as the lens in the lens barrel discussed above) that it is desired to pivot the optical fibre assembly about during adjustment of the tilt thereof.

The longitudinal position of the carrier means along the longitudinal axis of the connector body (e.g. manipulator means) throughbore can also be fixed, if desired. For example, the carrier means could include a notch which is engaged by a longitudinal positioning screw of the connector body (e.g. manipulator means). Alternatively or additionally, as discussed above, the lands on the outer surface of the carrier means body (where provided) could be arranged to fix the longitudinal position of the carrier means.

Where a separable keying means is used to fix the rotational orientation of the optical fibre assembly to the carrier means, then another separable keying means could also be used to fix the rotational orientation relative to the main connector body. However, particularly where the carrier means is or can be fixed rotationally about its longitudinal axis relative to the connector body (e.g. by the use of lands on its outer surfaces as discussed above), then only a single rotational keying means may be necessary.

Thus in a particularly preferred embodiment, the connector system comprises a single separable keying means that is securable to an optical fibre assembly and mates with at least the carrier means in one rotational orientation only. The single keying means could also mate with the main connector body in a single rotational orientation as well (e.g. by providing appropriately aligned slots on the carrier means and connector body for the keying means to engage—preferably in such an arrangement the keying means includes two "keys" (e.g. pins) for engaging respective slots on the carrier means and connector body, as that means that the same "key" (e.g. pin) does not have to mate with both the carrier means and connector body (which may, e.g., be awkward to achieve mechanically), but that may not be necessary where the carrier means is otherwise secured against rotation in the connector throughbore.

Thus it can be seen that in a particularly preferred embodiment, the connector system will include a carrier means having one or more lands on its outer surface for fixing the carrier means against rotation about its longitudinal axis when the carrier means is inserted in the connector body's throughbore and including a separable rotation keying means (e.g. collar) for securing to an optical fibre assembly.

Thus, according to a ninth aspect of the present invention, there is provided an adjustable connector system for coupling an optical fibre assembly to an optical component, comprising:

a carrier means having a body having a throughbore adapted to receive the optical fibre assembly in use;

and a manipulator means having a body having a throughbore adapted to receive removably the carrier means and optical fibre assembly in use, the manipulator means further including one or more adjustment means which are engageable against the outer surface of the carrier means when it is inserted in the manipulator means throughbore and are adjustable by a user to then move the carrier means relative to the manipulator means in a direction perpendicular to the longitudinal axis of the manipulator means throughbore;

the system further being arranged such that when the optical fibre assembly is inserted in the carrier means movement of said adjustment means to effect movement of said carrier means relative to the manipulator means causes corresponding movement of the optical fibre assembly relative to the manipulator means; and wherein the carrier means includes one or more lands on its outer surface arranged such that the carrier means can be inserted into the manipulator means in such a way that the adjustment means will in use engage only the lands, the lands further being arranged such that the carrier means can only be so inserted into the manipulator means in one or more discrete orientations with respect to rotation about the longitudinal axis of the manipulator means throughbore;

and the carrier means includes a separable keying means which mates with the carrier means body in a fixed orientation with respect to rotation about the longitudinal axis of the carrier means throughbore, the keying means being adapted to be securable to an optical fibre assembly such that while it is so secured it remains in a fixed orientation with respect to rotation about the longitudinal axis of the optical fibre assembly;

and the system further includes a polarising element for polarising electromagnetic radiation that passes through mounted in the manipulator means or in the carrier means such that electromagnetic radiation passing through the manipulator means throughbore will pass through the polarising element.

In a particularly preferred embodiment the connector system further includes means for resiliently biassing the optical fibre assembly against the connector system body. Where adjustment means are provided, the optical fibre assembly is preferably resiliently biased against the adjustment means. Thus, the manipulator means (where provided) preferably further includes means for resiliently biassing an inserted optical fibre assembly against the adjustment means when it is inserted in the manipulator means. Resiliently biassing the optical fibre assembly in this way reduces the number of e.g., adjustment or other means required to retain the optical fibre assembly in the connector system's body (e.g. manipulator means) whilst, e.g., still providing adjustment in the desired directions. It can also make the adjustment operation itself easier.

Where the connector system also includes a carrier means that receives the optical fibre assembly, then the carrier means is also according preferably resiliently biased against the connector system body and/or adjustment means. In this case, the biassing means could act on the carrier means directly, or it could do so indirectly, for example, by acting on the optical fibre assembly and thereby on the carrier means. In one preferred latter such arrangement, the biassing means for resiliently biassing the carrier means against the adjustment means is also arranged to act on the optical fibre assembly to resiliently bias it against and thereby retain it in the carrier means. For example, the resilient biassing means could act on the optical fibre assembly to hold it against the carrier means and the carrier means thereby against the adjustment means. In this arrangement, the same resilient biassing means will resiliently bias both the carrier means and the optical fibre assembly against the connector body (e.g. adjustment means).

However, in a particularly preferred embodiment, there are separate resilient biassing means for biassing the optical fibre assembly against the connector body and for biassing the carrier means against the connector body. This arrangement would allow, for example, a different biassing force to be applied to the optical fibre assembly and the carrier means. In such an arrangement there would, for example, be one or more biassing means biassing the carrier means against the connector body (e.g. adjustment means), and another biassing means for biassing the optical fibre assembly against the carrier means and thereby against the connector body (e.g. adjustment means).

It is believed that such an arrangement may be new and advantageous in its own right and not only in situations where a polarising element is included in the connector system. Thus, according to a tenth aspect of the present invention, there is provided an adjustable connector system for coupling an optical fibre assembly to an optical component, comprising:

a carrier means having a body having a throughbore adapted to receive the optical fibre assembly in use;

and a connector means having a body having a throughbore adapted to receive removably the carrier means and optical fibre assembly in use;

the connector means further including resilient biasing means for resiliently biasing an inserted carrier means against the connector means body, and a different resilient biasing means for resiliently biasing an inserted optical fibre assembly against the carrier means and thereby against the connector means body.

The resilient biasing means can also be used to fix the position of the carrier means (or optical fibre assembly) along the longitudinal axis of the connector body (e.g., manipulator means) throughbore, if desired. For example, where the resilient biassing means acts through a hole in the carrier means wall, the need to align the hole and the resilient biassing means could also be used to roughly fix the longitudinal position of the carrier means. The biassing means could also or instead engage a slot or groove provided in the outer surface of the carrier means (or optical fibre assembly) at a given longitudinal position along the carrier means (or optical fibre assembly).

Where the carrier means or optical fibre assembly is biassed against the adjustment means, the force applied by the biassing means on each adjustment means is preferably equal. In the case where there are plural adjustment means spaced apart along the longitudinal axis of the connector body (manipulator means), then there could be separate resilient biassing means at each longitudinal position of an adjustment means. This can help to avoid bending of the carrier means and/or optical fibre assembly. This can be important when dealing with the small movements associated with the alignment of optical fibres.

The resilient bias can be provided by, for example, a spring or springs, or by suitably arranged magnets.

In a particularly preferred embodiment the resilient biassing means is in the form of one or more leaf springs that extend along the longitudinal axis of the connector body throughbore. The leaf springs should penetrate into the connector body throughbore such that they will engage (and thereby resiliently bias) an optical fibre assembly and/or carrier means inserted into the throughbore. Using leaf springs is a convenient way of providing a more even biassing force along the length of an inserted optical fibre assembly and/or carrier means.

Preferably the leaf springs are arranged such that when an optical fibre assembly or carrier means is inserted, the leaf springs are not fully biassed, but retain some resilience. This is also preferred for other resilient biassing, e.g., spring, arrangements. This helps to ensure that the biassing action is a resilient one.

In a particularly preferred such embodiment, where the connector includes adjustment means, a single leaf spring is provided in a generally opposed position to each set of circumferentially spaced adjustment means to bias an inserted carrier means and/or optical fibre assembly against the adjustment means. Thus, for example, where there are two circumferentially spaced sets of adjustment means (e.g. for "x" and "y" translations) there will correspondingly be two circumferentially spaced leaf springs opposing the adjustment means.

The means for providing the biassing force is preferably arranged such that the biassing force can be selectively removed and reapplied when desired. This can allow, e.g., the carrier means and/or optical fibre assembly to be removed from the body without any need to move the positions of the adjustment means. In this way, the adjustment means can be left in their adjusted positions while the carrier means and/or optical fibre assembly is removed and reinserted as often as desired.

Such selective application of the biassing force could be provided, e.g., by a user-operable screw or screws that can act to increase and decrease the force applied by a spring to the carrier means and/or optical fibre assembly. A ratchet-type arrangement could be provided to facilitate more precise control of the biassing force, and/or to limit the biassing force that can be applied, if desired.

In a particularly preferred embodiment, only the resilient biassing force on the optical fibre assembly can be selectively removed and reapplied. This will require, as discussed above, separate resilient biassing means for the optical fibre assembly and carrier means (where present).

Where the biassing action is selectively removable by a user, then most preferably the means for removing and applying the biassing action can be accessed by a user from the same side of the connector body (i.e. around the connector's outer circumferential surface) as the adjustment means (if provided). Not having the adjustment means and resilient biassing application means arranged on, e.g., opposite sides around the connector's circumference, facilitates their access by a user in use. Most preferably the adjustment means and means for applying selectively the resilient biassing are arranged within an arc covering half and most preferably one quarter of the outer circumferential surface of the connector body (manipulator means). Thus, where the connector body is cylindrical, the adjustment means and means for applying selectively the resilient biassing are preferably arranged over a 180E and most preferably a 90E arc of the outer circumferential surface of the connector body (manipulator means).

It is again believed that such an arrangement may be new and advantageous in its own right and not only in situations where a polarising element is included in the connector system. Thus, according to an eleventh aspect of the present invention, there is provided an adjustable connector system for coupling an optical fibre assembly to an optical component, comprising:

a manipulator means having a body having a throughbore adapted to receive removably the optical fibre assembly in use;

the manipulator means further including one or more adjustment means which are adjustable by a user to move an optical fibre assembly inserted in the manipulator means throughbore relative to the manipulator means in a direction perpendicular to the longitudinal axis of the manipulator means throughbore, and means for selectively resiliently biassing an inserted optical fibre assembly against the adjustment means;

wherein the adjustment means and means for selectively applying the resilient biassing force are arranged such that they are accessible by a user from the same side of the manipulator means body.

As in such arrangements the resilient biassing means will need to bias the optical fibre assembly against the adjustment means, the means for selectively applying the resilient biassing force will have to effectively act to apply a resilient biassing force that opposes the adjustment means (and hence the means for selectively applying the resilient biassing force) when the resilient bias is to be applied. The means for selectively applying the resilient biassing force will therefore have to act on a resilient biasing arrangement that is arranged on an opposing side of the manipulator means throughbore to the means for selectively applying the resilient biasing force.

This can be achieved as desired, but in a particularly preferred such embodiment, the means for selectively applying the resilient bias is arranged to be able to move a resilient biasing arrangement, such as a spring arrangement, that opposes the adjustment means, towards and away from the adjustment means. Preferably the arrangement is such that a collar that surrounds the connector body throughbore can be moved towards and away from the adjustment means, with the collar then acting on a resilient biasing arrangement (preferably in the form of a leaf spring) that will bias an inserted optical fibre assembly towards the adjustment means (i.e. arranged on the opposite side of the connector longitudinal axis to the means for selectively applying the resilient bias). The collar can then be moved towards or away from the adjustment means to force the resilient biasing arrangement towards (thereby, e.g., increasing the resilient bias) or away from (thereby, e.g., decreasing the resilient bias) the adjustment means. The collar preferably lies outside the resilient biasing, e.g. spring, arrangement to achieve this.

Thus, according to a twelfth aspect of the present invention, there is provided an adjustable connector system for coupling an optical fibre assembly to an optical component, comprising:

a connector means having a body having a throughbore adapted to receive removably an optical fibre assembly in use;

the connector means further including means for selectively resiliently biasing an inserted optical fibre assembly against the connector means body comprising means for selectively applying a resilient biasing force that is moveable in use to draw a resilient biasing arrangement that is arranged on an opposing side of the connector means throughbore to the means for selectively applying a resilient biasing force towards and away from an optical fibre assembly which is inserted in the connector means throughbore.

In this aspect of the invention, the means for selectively applying a resilient biasing force that is moveable in use to draw a resilient biasing arrangement towards and away from an optical fibre assembly which is inserted in the connector means throughbore preferably comprises a collar surrounding the connector means throughbore that is moveable in use to draw a resilient biasing arrangement towards and away from an optical fibre assembly which is inserted in the connector means throughbore, as discussed above.

In this aspect and these arrangements of the present invention, the means for selectively applying the resilient bias, e.g. collar, is preferably movable by a user in use, e.g., to draw the resilient biasing, e.g., spring, arrangement towards and away from the inserted optical fibre assembly. This could be achieved by means of, for example, a screw that can be screwed into and out of the connector body or a component of the connector system (e.g. collar) by a user in use to thereby move the means for selectively applying the resilient bias, e.g. collar, within the connector body. Again, a ratchet-type arrangement could be used to facilitate more precise adjustment of the resilient biasing means (e.g. movement of the collar), and/or to limit the biasing force that can be applied, if desired.

In a particularly preferred embodiment, where the resilient biasing force can be selectively applied by a user, the arrangement is preferably such that the means for applying the resilient biasing force is biassed to apply that force automatically (if an optical fibre assembly is inserted in the connector body), but is operable by a user to release the force being applied. Thus the means for selectively applying the resilient biassing to an inserted optical fibre assembly preferably has two states: a first, default state in which it biassed to a position where it would apply a biassing force to an inserted optical fibre assembly, and a released state into which it can be forced by a user. These arrangements are preferably further arranged such that a user is unable to adjust the amount of force applied to an inserted optical fibre assembly when the biassing means is set in its "biassing" position (i.e. when it applies the biassing force) (i.e. such that a user can effectively only operate the biassing means to release the force being applied).

These arrangements are advantageous as they mean that a user simply has to release the force to insert and remove an optical fibre assembly, but does not need then to otherwise adjust the system to apply the resilient biassing force when the optical fibre assembly is inserted. They therefore provide a "quick-release" type operation. They can also avoid the user having to and being able to adjust and apply the resilient biassing force to an inserted optical fibre assembly (since the force is automatically applied by the resilient biassing means), which may be undesirable, particularly where the system is to be operated by "unskilled" users, and accordingly can ensure more consistent and repeatable resilient biassing force on an inserted optical fibre assembly.

Such arrangements can be achieved as desired. For example, resilient biassing means, such as a spring, could be provided to bias the means for selectively applying the resilient biassing force to an inserted optical fibre assembly to its position where it would apply the resilient biassing force to an inserted optical fibre assembly, with a user then able to move the means for selectively applying the resilient biassing force away from that position against the bias to release the resilient biassing force on an inserted optical fibre assembly (but with the resilient bias then returning the means for selectively applying the resilient biassing force automatically to its position where it would apply the resilient biassing force to an inserted optical fibre assembly once the user releases their action to move the means for selectively applying the resilient biassing force).

For example, where the means for selectively applying the resilient biassing force comprises means, such as a collar, that is movable to draw a resilient biassing, e.g., spring, arrangement towards and away from an inserted optical fibre assembly, the means for selectively applying the resilient biassing force, e.g. collar, could be resiliently biassed to its position where it draws the resilient biassing arrangement towards the inserted optical fibre assembly, with a user then being able to move the means for selectively applying the resilient biassing force, e.g. collar, away from that position against the resilient bias.

Preferably the means for selectively applying the resilient biassing force, e.g. collar, is coupled or connected to a shaft that is resiliently biassed to a position (e.g. an outward position) in which the means for selectively applying the resilient biassing force, e.g. collar, will draw the resilient biassing arrangement towards an inserted optical fibre assembly, but which shaft can be moved (e.g. preferably by being pressed inwards) by a user to release the resilient biassing force on an inserted optical fibre assembly, with the shaft returning to its original (e.g. outward) position once a user releases it. This provides a convenient "quick-release"-type mechanism for an inserted optical fibre assembly.

It is preferred that when the means for selectively applying the resilient biassing force is "fully" applied, i.e. set to apply the maximum biassing force (e.g. at its maximum length of travel), there is still some resilient play left in the resilient biassing means. This avoids, e.g., risk of applying the means for applying the resilient biassing force so tightly that there is then a "direct" biassing force (i.e. without any resilience) on the optical fibre assembly and/or carrier means, etc., which could then cause damage to components of the system.

Where a collar is used to apply the resilient biassing force as discussed above, preferably the collar and spring arrangement is such that at the maximum length of travel, the spring would not be fully compressed between the collar and an inserted optical fibre assembly (or carrier means), thereby retaining some resilience in the spring arrangement. For example, where the spring arrangement is a leaf spring, the collar should not be able to fully compress the leaf spring against an inserted optical fibre assembly (or carrier means) (as if that were to occur, the collar would then effectively be itself applying the biassing force directly).

According to a thirteenth aspect of the present invention, there is provided an adjustable connector system for coupling an optical fibre assembly to an optical component, comprising:

a connector means having a body having a throughbore adapted to receive removably the optical fibre assembly in use;

the connector means further including means for selectively resiliently biassing an inserted optical fibre assembly against the connector means body;

wherein the means for selectively applying the resilient biassing force is arranged such that the adjustment it provides is constrained to ensure that there is always some resilient play left in the resilient biassing means.

As will be appreciated by those skilled in the art, the above aspect of the invention (and all the other aspects of the invention described above) can include any one or more or all of the preferred features of the invention discussed above, as appropriate.

It will be appreciated from the above that one use of the present invention, in its preferred embodiments at least, will comprise fixing the connector body to an optical component, inserting an optical fibre assembly therein, and, if necessary, further aligning the optical fibre assembly with the polarising element in the connector body.

Thus, according to a fourteenth aspect of the present invention, there is provided a method of coupling an optical fibre assembly to an optical component, comprising:

mounting a body having a throughbore adapted to receive an optical fibre assembly in use to the optical component;

arranging an optical fibre assembly in the throughbore; and arranging a polarising element for polarising electromagnetic radiation that passes through it in the throughbore such that electromagnetic radiation passing through the throughbore will pass through the polarising element.

This aspect of the invention can, as will be appreciated by those skilled in the art, include any one or more or all of the preferred features of the invention discussed above, as appropriate. Thus, for example, the polarising element can be provided in the throughbore by (previously) mounting it in the connector body or in a carrier carried within the connector body, or by including it in the optical fibre assembly which is to be inserted into the connector body. This aspect of the invention could also, for example, further include steps of orienting the optical fibre assembly rotationally in the connector body and then securing a separable collar with keying means thereto so as to allow reproduction of that rotational orientation upon removal and reinsertion of the optical fibre assembly.

BRIEF DESCRIPTION OF THE DRAWINGS

A number of preferred embodiments of the present invention will now be described by way of example only, and with reference to the accompanying drawings, in which:

FIG. 1 shows a prior art optical fibre connector;

FIG. 3 shows the side cross-sectional view taken along the line A—A in FIG. 4 of the optical fibre connector of FIG. 2 when assembled and mounting an optical fibre assembly;

FIG. 4 shows a cross-sectional view along the line B—B shown in FIG. 3;

FIG. 5 shows an example of an optical fibre assembly in the form of a lens barrel;

Like reference numerals are used for like components and features throughout the drawings and the following description.

DETAILED DESCRIPTION OF THE INVENTION

An optical fibre connector in accordance with the Applicant's earlier connector described in their UK Patent No. 2325058 will first be described to help illustrate the present invention. In essence an optical fibre connector system in accordance with embodiments of the present invention can comprise any or all of the features of this earlier connector of the Applicants, but will additionally include, as discussed above, a polarising element.

Figure 2:
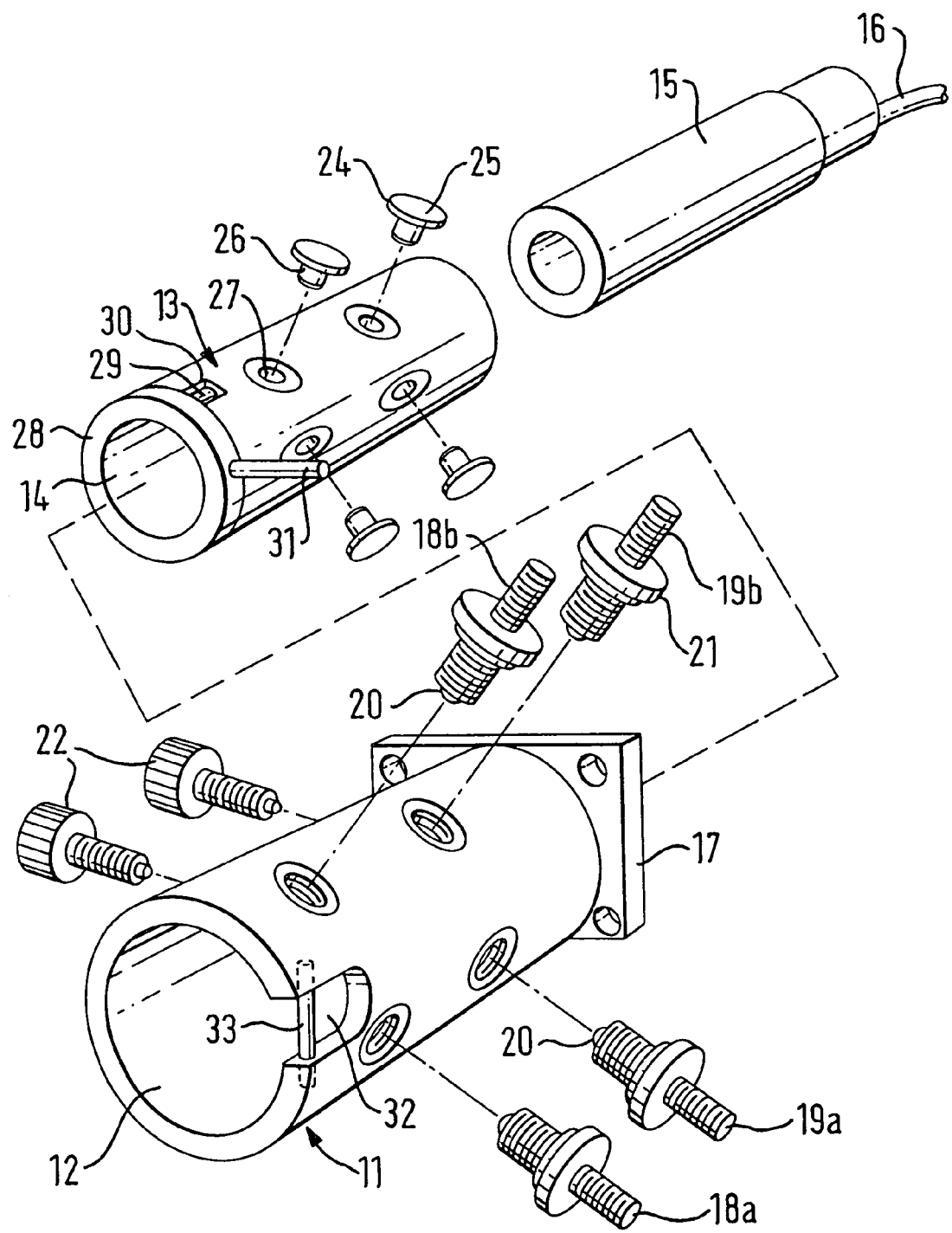
FIG. 2 shows a schematic exploded view of another optical fibre connector.

The optical fibre connector shown in FIG. 2 comprises a main body in the form of a manipulator 11 in the form a cylindrical tube having a throughbore 12 which removably receives a sleeve-like carrier 13 again in the form a cylindrical tube having a throughbore 14. The carrier 13 receives removably the optical fibre assembly 15 which is to be coupled to another optical component by means of the connector.

While the manipulator, carrier and optical fibre assembly are shown as being in the form of cylindrical tubes, it will be appreciated that they can have other geometries, if desired.

The optical fibre assembly 15 is shown in this embodiment as being a lens barrel which carries an optical fibre 16. However, the optical fibre assembly is not restricted to such arrangements. It could, for example, comprise a cylinder mounting a different optical element and an optical fibre, a cylinder mounting an optical fibre alone, or simply the optical fibre on its own. The optical fibre 16 is a polarisation-maintaining optical fibre, although that is not essential.

The manipulator 11 includes a flange 17 by which it can be attached to the optical component such as a laser source to which the optical fibre assembly 15 is to be coupled. The flange can alternatively be used to attach the manipulator to an optical bench.

The manipulator 11 also includes two pairs of adjustment screws 18a, 18b and 19a, 19b, with the screws of each pair being arranged at the same position along the longitudinal axis of the manipulator body, but acting in orthogonal directions towards and away from the longitudinal axis of the manipulator. In this way, appropriate rotation of the screws can be used to displace the carrier and optical fibre assembly when inserted within the manipulator relative to the longitudinal axis of the manipulator.

The contact tips 20 of the screws must allow the contact point with the carrier to be well defined and the carrier 13 to pivot about it. The screws therefore preferably have spherical ends. The screw tips 20 should also ideally be sufficiently hard such that deformation of them in use is reduced or eliminated. They could, for example, comprise hardened steel or ceramic balls.

The adjustment screws 18, 19 could, for example, comprise fine pitch screws which operate radially, or differential threaded screws, or tapered pins. Locking rings 21 can also be provided to prevent accidental movement of the adjustment screws in use.

The sensitivity of the lateral adjustment can be altered by varying the screw pitch, and the tilt sensitivity can be varied by changing the lateral sensitivity or separation of the adjustment points, or a combination of the two.

Other forms of adjustment means such as, for example, piezo devices are, of course, possible.

In this connector, the adjustment means provide the possibility of lateral adjustment of the optical fibre assembly relative to the longitudinal axis of the manipulator, and adjustment of the tilt of the longitudinal axis of the optical fibre assembly relative to the longitudinal axis of the manipulator. However, the exact number and arrangement of the adjustment means will depend upon the number of degrees freedom needed to be adjustable or constrained, and thus there could be more or less or differently arranged adjustment means to those shown.

It is also possible to provide means such as a threaded sleeve to allow adjustment along the longitudinal axis of the connector.

The manipulator also includes two adjustable spring plungers 22 mounted at the same position along the longitudinal axis of the manipulator as the adjustment screws 18, 19, but at generally opposed locations around the circumference thereof, for applying a variable resilient biassing force to urge the carrier 13 against the contact points of the adjustment means when it is inserted into the manipulator. In this embodiment the spring plungers 22 in fact penetrate the carrier 13 via holes 23 and thus actually act on the carrier 13 via the optical fibre assembly 15. This arrangement can be seen in FIG. 4.

The spring plungers 22 can, for example, comprise springs mounted on screws which can then be screwed towards or away from the longitudinal axis of the manipulator to provide the biassing force as desired.

It should be noted that in this arrangement the spring bias points are positioned in line with the adjustment means, such that there is a reduced possibility of bending the optical fibre assembly in use.

The resilient biassing means should be preferably arranged in use such that the biassing force at each of the contact points is identical, as this helps to achieve reliable alignment and reproducibility.

It should also be noted that the geometry of adjustment means and the biassing means in this connector means the optical fibre assembly cannot be rotated about its longitudinal axis when the bias force is applied, since any rotation will create unequal forces at each contact point and the system will not be in equilibrium, such that the carrier will then be rotated by the bias force until the load is the same for all contact points, i.e. equilibrium is restored.

The carrier 13 includes plural pads 24, which have flat, planar surfaces 25 and protruding studs 26 mounted therein. The pads are arranged in holes 27 in the carrier body such that their flat surfaces effectively form part of the outer surface of the carrier. These flat surfaces then form lands that the adjustment means engage, as can be seen from FIG. 4. They should therefore all lie appropriately co-planar (i.e. in the present embodiment each longitudinally spaced pair should lie in parallel planes and most preferably in the same plane). The studs 26 penetrate into the throughbore of the carrier such that they form contact points against which the optical fibre assembly engages. This ensures that the optical fibre assembly engages the carrier at discrete points, rather than across a significant area of their facing surfaces.

The flat surfaces and studs are preferably sufficiently hard such that they will not deform in use.

The pads are arranged in the carrier such that carrier and manipulator can be arranged such that the adjustment means of the manipulator engage only the flat planar surfaces (i.e. lands) when the carrier is inserted in the manipulator.

The carrier also includes a separable collar 28 which mates with the main body of the carrier in a single orientation with respect to rotation about the longitudinal axis of the carrier. To achieve this the collar 28 has a pin 29 which engages in a corresponding slot 30 on the carrier body. The collar further includes a number of grub screws to enable it to be secured to the optical fibre assembly. The collar allows the rotational orientation of the optical fibre assembly with respect to the carrier and thereby the manipulator to be fixed.

The securement position of the collar on the optical fibre assembly can also be chosen to be at an appropriate point along the length thereof to ensure that the flat lands on the carrier lie about the point at which it is desired to pivot the optical fibre assembly, such as the lens contained in a lens barrel.

The collar also includes a pin 31 which can engage a slot 32 on the manipulator and be secured therein by a further pin 33 to constrain the carrier within the manipulator.

The manipulator and carrier also include magnets 34 which can retain the carrier within the manipulator even when the optical fibre assembly has been removed therefrom. The magnets are appropriately arranged such that they retain the carrier in a position where the flat lands 25 on its outer surface are aligned with the contact tips 20 of the adjustment screws 18, 19.

The alignment procedure for this connector is as follows.

The optical fibre assembly and carrier are inserted into the manipulator such that the flat lands 25 on the surface of the carrier align with the adjustment screws 18, 19 of the manipulator. The spring plungers 22 are then screwed in to act on the optical fibre assembly and thereby to resiliently bias the optical fibre assembly and carrier against the adjustment screws.

The tilt of the optical fibre assembly in the manipulator would then typically be adjusted first, although this is not mandatory. The tilt is adjusted by moving the adjustment screws of one or other pair of screws 18, 18b or 19a, 19b while keeping the other pair of adjustment screws stationary. In this way the optical fibre assembly is pivoted by the moving screws about the point held stationary by the stationary pair of screws. Each adjustment screw of the moving pair would usually be moved individually to tilt the optical fibre assembly in each plane separately. Thus, for example, the screw 18a could be moved while keeping the remaining screws stationary to tilt the optical fibre assembly in one plane about the screws 19a, 19b, and then the screw 18b moved while keeping the remaining screws stationary to tilt the optical fibre assembly in the orthogonal plane about the screws 19a, 19b.

Once the tilt alignment has been adjusted, the lateral alignment can then be set by displacing the optical fibre assembly laterally in the plane perpendicular to the longitudinal axis of the manipulator by moving the adjustment screws 18a, 19a and/or 18b, 19b together as pairs.

The tilt and lateral adjustments can be repeated as desired until the desired tilt and lateral alignment has been achieved.

Once the tilt and lateral alignment have been optimised, the optical fibre assembly can be rotated about its longitudinal axis until the correct rotational orientation is achieved.

Once this orientation has been achieved the collar can be secured to the optical fibre assembly, thereby preventing further rotation of the optical fibre assembly relative to the carrier and thus the manipulator when the collar is properly mated with the carrier body.

This arrangement ensures that the optical fibre assembly (together with the collar secured to it) can be removed and replaced without the need for realignment, since the same points will be in contact and the alignment preserved.

As an alternative arrangement to the above, the carrier could be omitted and the optical fibre assembly inserted directly in the manipulator. In this case the optical fibre assembly could be similar to the lens barrel shown, but with suitable flat lands arranged on its outer surface. An example of such a construction is illustrated in FIG. 5. In this arrangement the optical fibre assembly 15 would be inserted directly in the manipulator and then aligned as above described.

As discussed above, an optical fibre connector system in accordance with an embodiment of the present invention can comprise a system as described above, but will further include a polarising element that is located in use in the throughbore 12 of the connector system. As discussed above, the polarising element could be mounted in the optical fibre assembly 15 itself, or in the carrier 13, or in the manipulator body 11.

Figure 6:
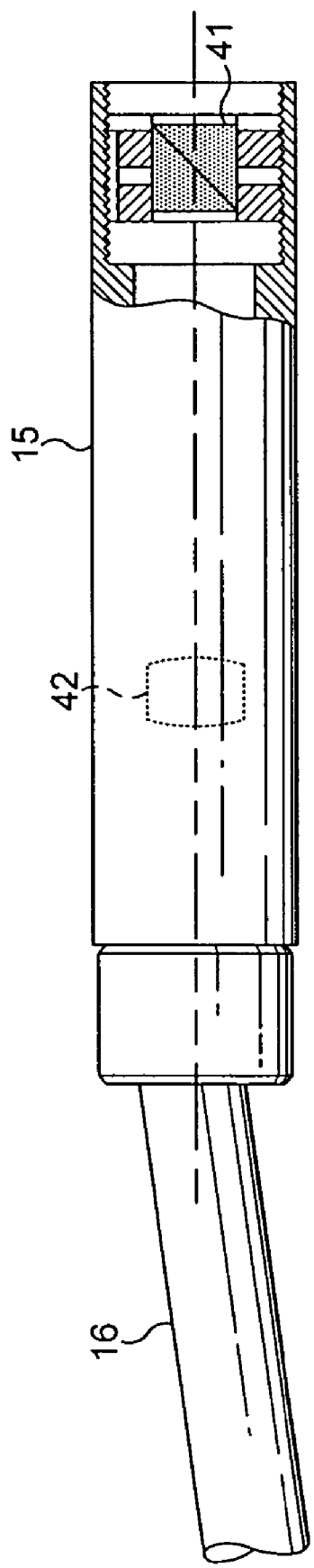
FIG. 6 shows the inclusion of a polarising element in an optical fibre assembly.

FIG. 6 shows a polarising element 41 located in an optical fibre assembly 15. The optical fibre assembly 15 is in the form of a lens tube which includes a lens 42.

Figure 7:
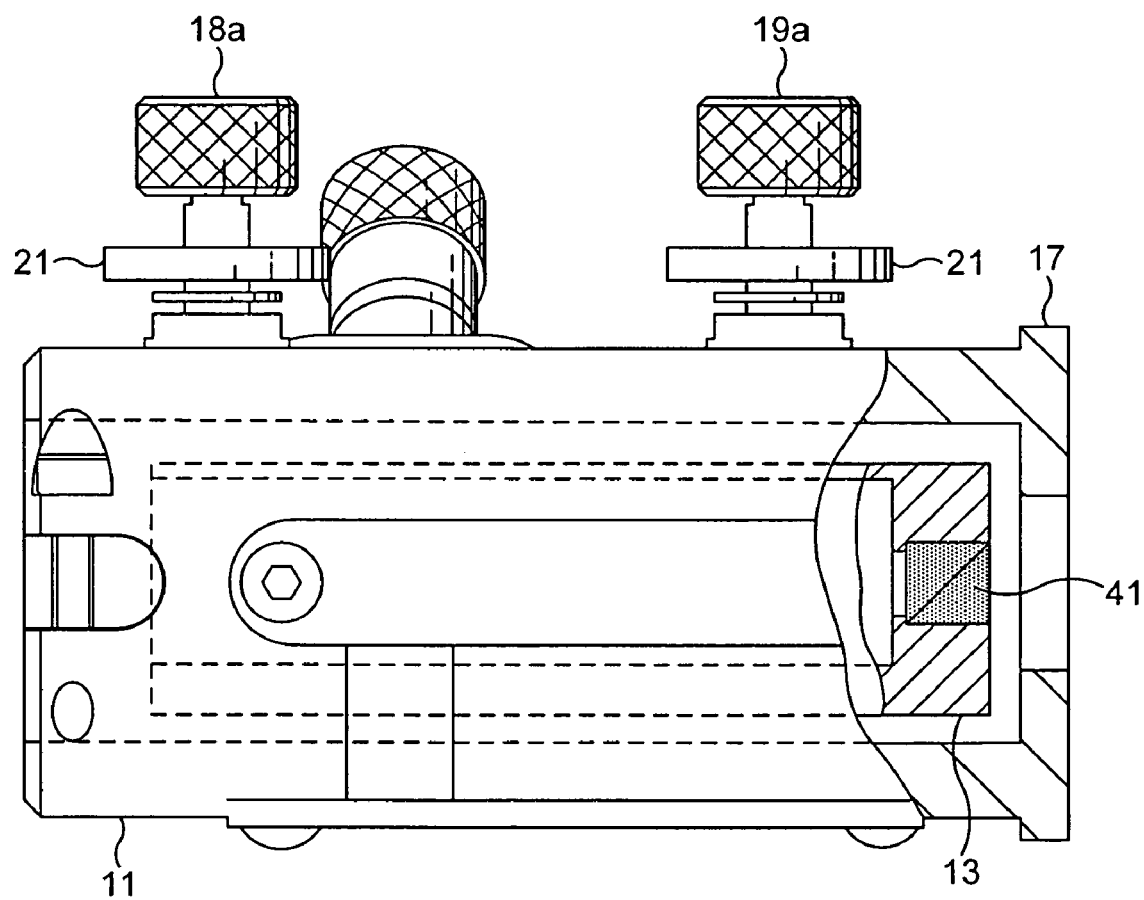
FIG. 7 shows the inclusion of a polarising element in the carrier of a connector system like that of FIG. 2.
Figure 8:
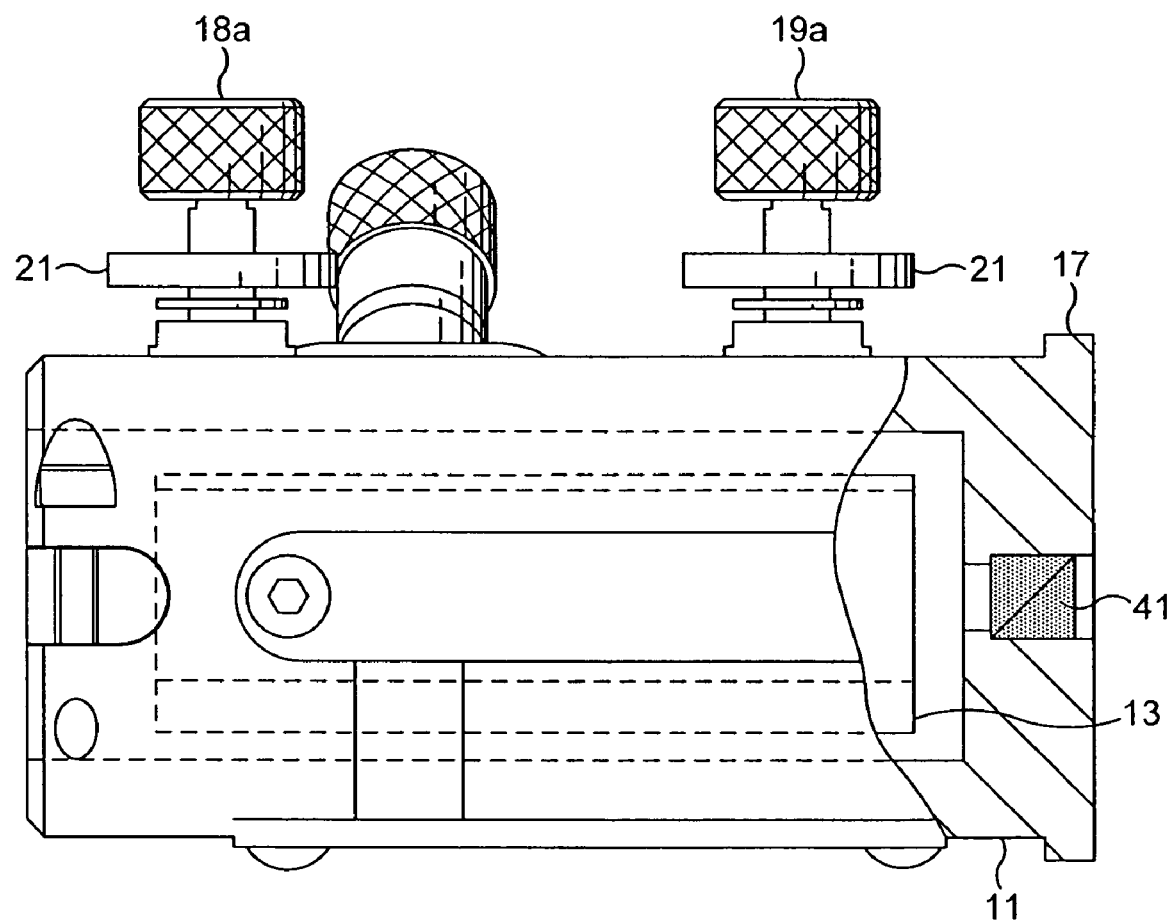
FIG. 8 shows the inclusion of a polarising element in the manipulator of a connector system like that of FIG. 2.

FIG. 7 shows an embodiment in which the polarising element 41 is arranged in the carrier 13. FIG. 8 shows an arrangement in which the polarising element 41 is arranged in the connector body (manipulator) 11.

It can be seen that in each of the arrangements shown in FIGS. 6, 7 and 8, in use the polarising element 41 will be arranged in the longitudinal throughbore 12 of the connector system such that light passing through the connector system will pass through the polarising element. As discussed above, the polarising element acts to provide the transmission of plane polarised light of a particular orientation through the throughbore and can comprise, for example, a dielectric-coated beam splitter cube or a birefringent material.

The polarising element 41 is fixed in place and is arranged such that the plane polarised light that it transmits along the throughbore has a particular orientation with respect to the fixing flange 17 of the main connector body. In the embodiment shown in FIGS. 7 and 8, where the polarising element 41 is either located in the carrier 13 or the manipular 11, this is achieved by appropriate orientation of the polarising element 41 in those components. Where the polarising element 41 is located in the optical fibre assembly (lens tube) 15 itself, as shown in FIG. 6, then appropriate orientation of polarising element 41 is achieved by appropriate rotational orientation of the optical fibre assembly 15 within the connector throughbore.

FIGS. 9 to 13 illustrate an alternative arrangement of the connector system and in particular of the resilient biasing arrangement for resiliently biasing an optical fibre assembly within the connector body. This embodiment has many similar components and features to the connector system described above, and thus like references numerals are used in FIGS. 9 to 13 for components corresponding to components in the above described connector arrangement.

Figure 9:
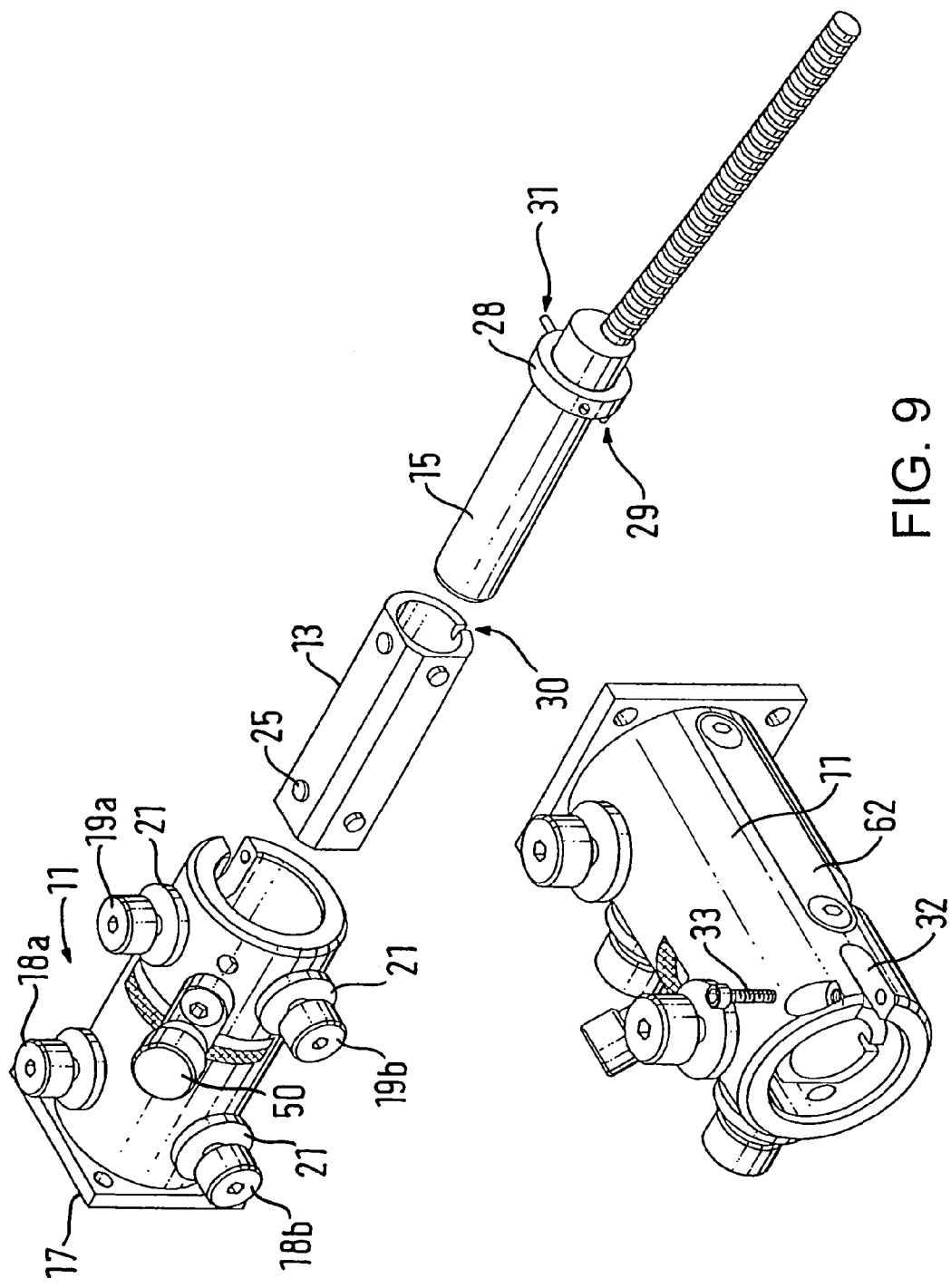
FIG. 9 shows another preferred embodiment of a connector system arrangement in accordance with the present invention.

FIG. 9 shows schematically the overall connector system layout. It includes a main connector body in the form of a manipulator 11 which has a flange 17 for fixing to another optical component such as a laser, two pairs of adjustment screws 18, 19 (together with locking rings 21) for adjusting the position of an optical fibre assembly inserted within the manipulator 11 and a further adjustment screw 50 which can be used to selectively apply a resilient biasing force to an inserted optical fibre assembly as will be discussed further below.

In this embodiment, as before, a carrier 13 having planar lands 25 on its outer surface is arranged to be inserted in the manipular 11 and to receive an optical fibre assembly 15 in use. The carrier 13 again includes a separable collar 28 that can be secured to an optical fibre assembly and includes a pin 29 and slot 30 for fixing rotational orientation of the optical fibre assembly with respect to the carrier 13. The collar 28 also includes a further pin 31 that engages a slot 32 in the manipulator 11 to help fix rotation within the manipulator 11 and also to allow the assembly to be retained within the manipulator body 11 by means of a retaining pin 33.

This connector system can be used in a similar manner to the connector system discussed above, to adjust the rotational orientation about its longitudinal axis of the optical fibre assembly 15 within the connector and then to ensure the repeatability of that orientation upon repeated removal and reinsertion of the optical fibre assembly.

The connector system also includes, as discussed above, a polarising element, either in the optical fibre assembly 15 itself, in the carrier 13, or in the manipulator body 11.

This embodiment of the connector system differs from the earlier connector system described in the way that the carrier 13 and optical fibre assembly 15 are resiliently biassed against the adjustment means 18, 19 and the manipulator body 11. In this embodiment separate biassing means are provided for the carrier 13 and for the optical fibre assembly 15.

Figure 10:
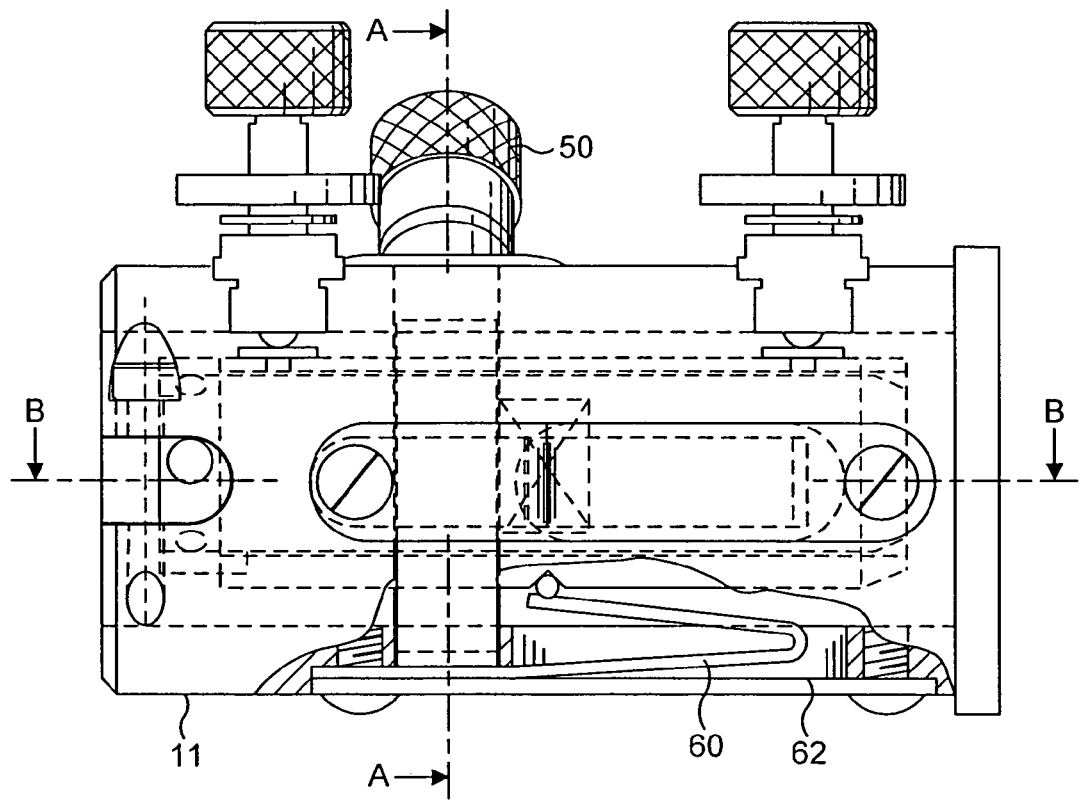
FIG. 10 shows another view of the connector of FIG. 9.
Figure 11:
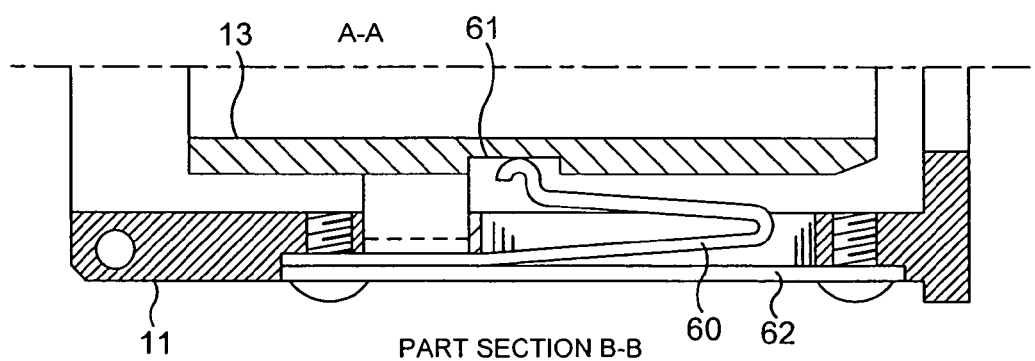
FIG. 11 is a cross-sectional view along the line B—B in FIG. 10.

FIG. 10 shows the arrangement of the resilient biassing means for the carrier 13. Two leaf springs 60 are provided in generally opposed relationship to the respective circumferentially spaced pairs of adjustment screws 18a, 19a and 18b, 19b, and engage in slots 61 (see FIG. 11, which is a cross-section along the line B—B in FIG. 10) in the carrier 13. These leaf springs act to resiliently bias the carrier against the adjustment means 18a, 19a and 18b, 19b when the carrier 13 is inserted in the manipulator 11. As the leaf springs 60 engage in slots 61 in the carrier body, they also fix the position of the carrier 13 along the longitudinal axis of the manipulator 11.

The leaf springs 60 are held in place and act against plates 62 which are screwed to the manipulator 11 and cover longitudinal slots in the manipulator wall through which the leaf springs 60 extend into the throughbore of the manipulator 11 so that they will engage the carrier 13 when it is inserted in the manipulator 11.

Figure 12:
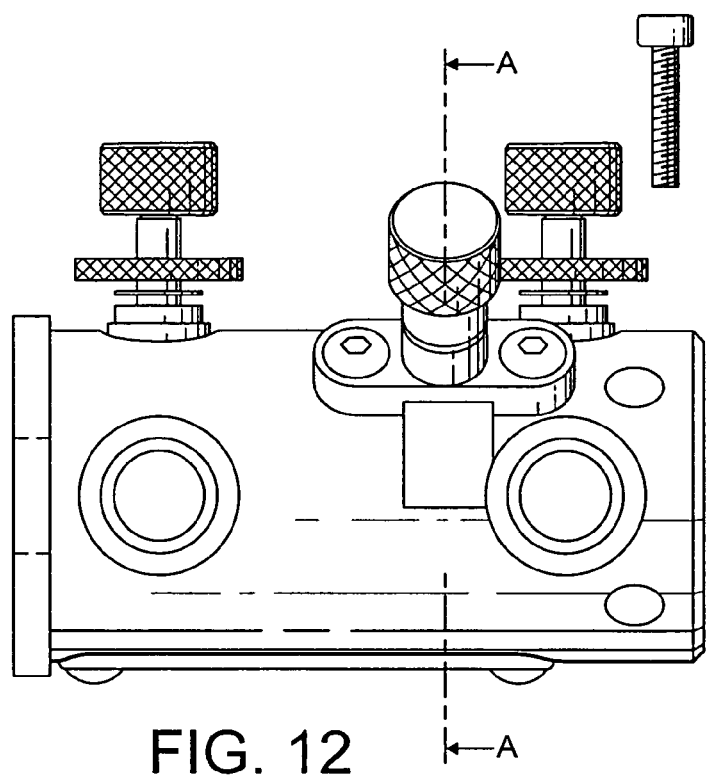
FIG. 12 is another view of the connector of FIG. 9.

The resilient biasing arrangement for biasing the optical fibre assembly 15 against the carrier 13 (and thereby against the manipulator 11 and the adjustment means 18a, 19a, 18b and 19b), will now be described. In this embodiment the resilient biasing can be selectively applied to an inserted optical fibre assembly by a user by means of adjusting a screw 50. FIG. 12 shows an external view of the manipulator 11 showing the location of the adjusting screw 50 relative to the adjustment screws 18, 19. It can be seen that the adjusting screw 50 is arranged on the same side of the manipulator 11 as the adjustment screws 18, 19 (in the same quadrant around the circumference of the surface of the manipulator 11). This means that all the necessary user adjustments can be accessed from the same side of the manipulator 11, which may be more convenient in use.

Figure 13:
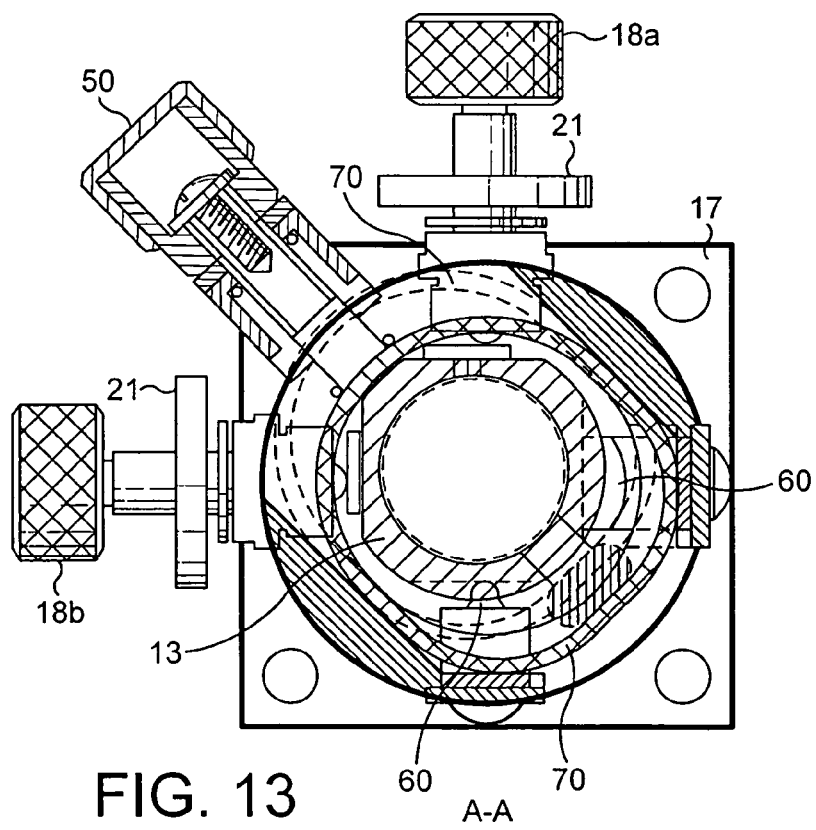
FIG. 13 is a cross-sectional view along the line A—A in FIGS. 10 and 12.

FIG. 13 is a cross section along the line A-A in FIG. 12 (and FIG. 10) and shows the operation of the user adjustable biasing screw 50. The leaf springs 60 biasing the carrier 13 against the adjustment means can also be seen in FIG. 13.

As shown in FIG. 13, the user operable biasing adjustment screw 50 acts on a collar 70 which surrounds the carrier 13 (and hence an inserted optical fibre assembly) within the manipulator throughbore 12. Screwing the adjusting screw 50 towards and away from the central longitudinal axis of the connector moves the collar 70 away from and towards, respectively, the adjustment means 18, 19 (and the adjusting screw 50). The solid and dashed lines in FIG. 13 show the extent of travel of the collar 70.

The collar 70 acts on a further leaf spring 72 which extends longitudinally within the throughbore and can penetrate through the carrier means 13 and engage an inserted optical fibre assembly. One end of the leaf spring 72 at least is positioned inside and lies across the collar 70 such that as the collar 70 is moved laterally within the throughbore it will pull the leaf spring 72 towards, or allow it to move away from, an inserted optical fibre assembly (and the adjustment means 18, 19) accordingly. In this way, by turning the adjusting screw 50, the user can increase or decrease the resilient bias applied by the leaf spring 72 on an optical fibre assembly, thereby to allow an insertion of the optical fibre assembly (when the collar is applying least force to the leaf spring) and then biasing the optical fibre assembly against the carrier means and thereby against the manipulator when the screw is tightened to move the collar towards the adjusting screw 50. In this way the user can selectively apply a resilient biasing force to an inserted optical fibre assembly by adjusting the screw 50.

The leaf spring 72 and collar 70 are arranged such that even at the maximum extent of its travel, the collar 70 does not fully compress the leaf spring 72, so that there is always some resilient bias in the arrangement.

A spring 74 can also be provided acting between the outer surface of the collar 70 and an underside of the housing for the adjusting screw 50 to provide a resilient bias to the movement of the collar (which, for example, can assist and smooth that movement).

Figure 14:
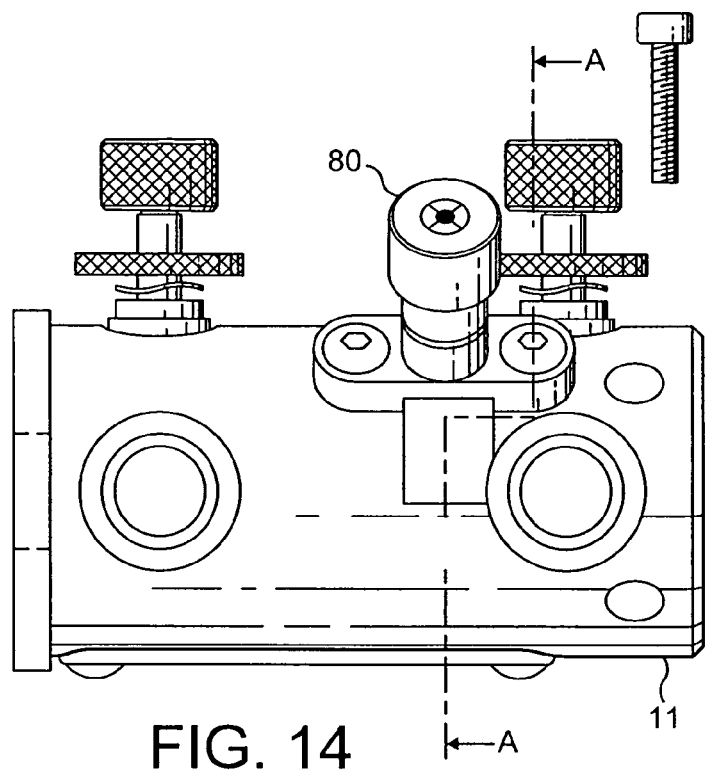
FIG. 14 shows another preferred embodiment of a connector system arrangement in accordance with the present invention.
Figure 15:
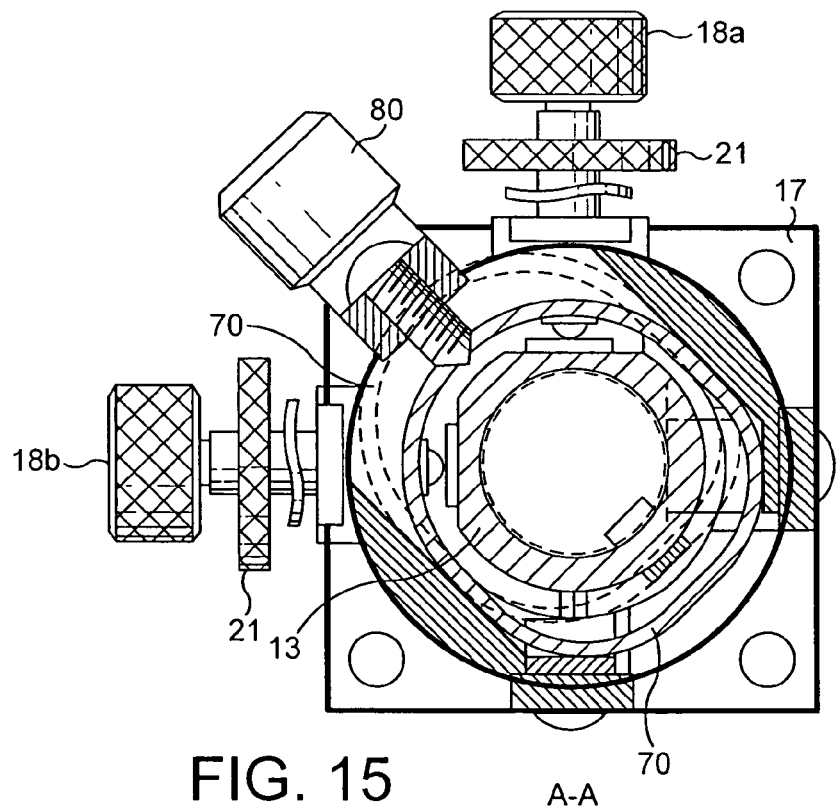
FIG. 15 is a cross-sectional view along the line A—A in FIG. 14.
Figure 16:
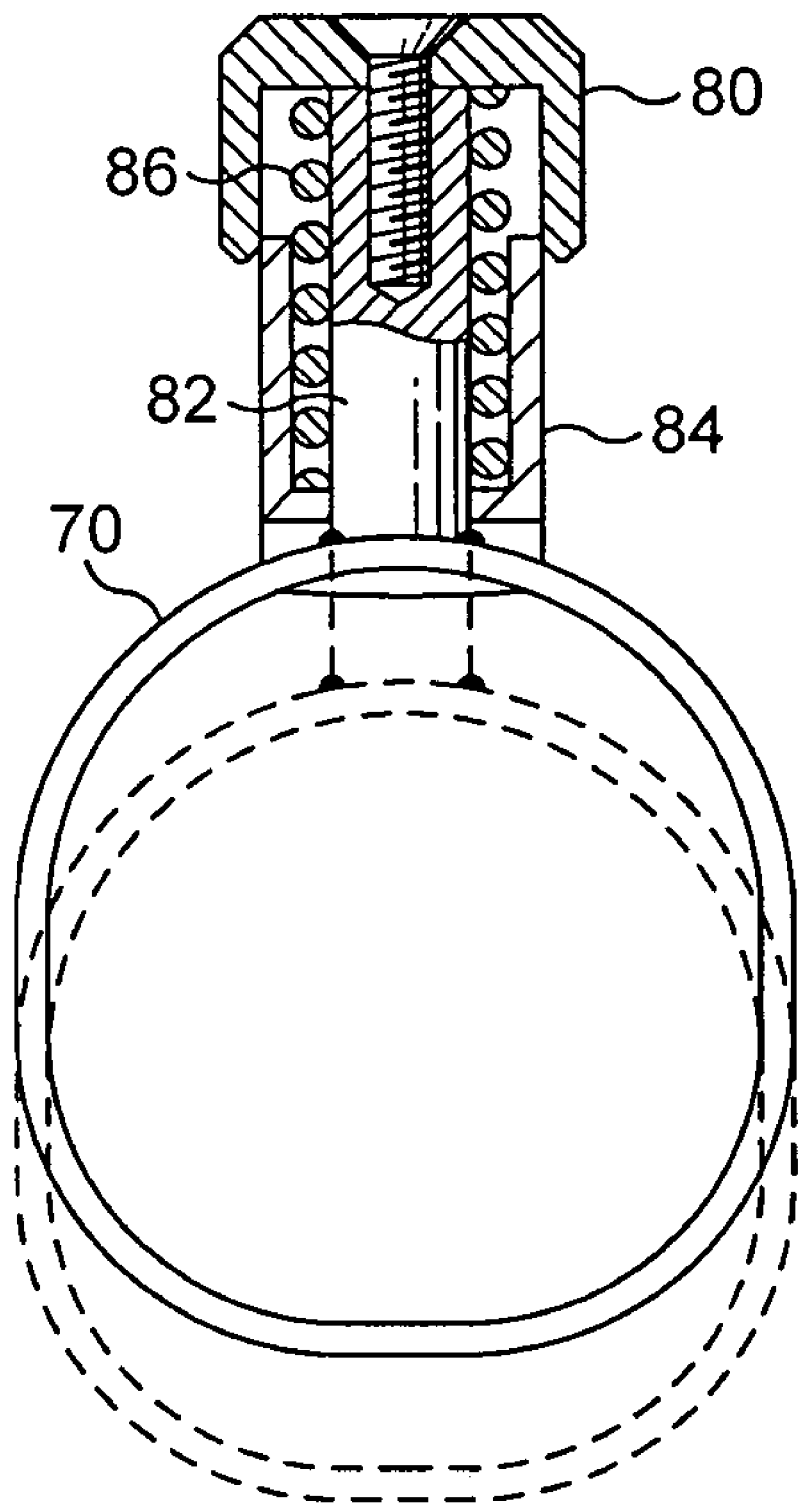
FIG. 16 is a schematic view of part of the biassing arrangement of the connector system of FIGS. 14 and 15.

FIGS. 14 to 16 show a further embodiment of a connector system in accordance with the present invention that is essentially identical to the embodiment shown in FIGS. 9 to 13 save for in relation to certain aspects of the resilient biassing arrangement. The differences between this embodiment and the embodiment shown in FIGS. 9 to 13 will be described below. (Again, like reference numerals have been used for like components).

FIG. 14 shows an external view of the connector system and FIG. 15 is a cross-section along the line A—A in FIG. 14.

In this embodiment, the connector system again includes a resilient biassing arrangement for biasing an inserted optical fibre assembly against the carrier and hence against the manipulator and adjustment means, which allows a user to selectively apply the resilient biassing force. This operation is again provided, as in the embodiment of FIGS. 9 to 13, by means of a collar 70 which surrounds the carrier 13 within the manipulator throughbore and which collar can be moved towards and away from the adjustment means 18, 19 and which acts on a leaf spring 72 to apply appropriately a resiliently biassing force on an inserted optical fibre assembly.

However, in this embodiment, the movement of the collar 70 is controlled by means of a push-button mechanism 80, rather than by an adjustment screw as in the embodiment shown in FIGS. 9 to 13.

FIG. 16 shows the push-button 80 arrangement in more detail. A user operable button 80 is attached to a shaft 82 that is attached to the collar 70. The shaft 82 can move reciprocally within an outer sleeve 84. The sleeve 84 is fixed to the connector body. The button 80 can move relative to the sleeve 84 and when doing so moves the shaft 82 and collar 70 correspondingly. In this arrangement therefore, moving the button 80 up and down causes the collar 70 to move accordingly within the connector body (in the same way and having the same effect as movement of the adjustment screw 50 in the embodiment of FIGS. 9 to 13).

A spring 86 is provided to resiliently bias the button 80 to its outward position (in which the collar 70 will cause the spring 72 to apply a biassing force to an inserted optical fibre assembly). A user can press the button 80 inwards against the action of the spring 86 to move the collar 70 to a position where it releases the biassing force on an inserted optical fibre assembly (thereby allowing insertion or removal of an optical fibre assembly). When the button 80 is released by a user, the spring 86 returns it to its outward position (and thus applies the biassing force to an inserted optical fibre assembly, if any). In this way, a "quick-release" mechanism for an inserted optical fibre assembly is provided.

The above embodiments have been described with reference to the adjustment and alignment of a lens barrel. However, it is applicable to other situations and optical fibre assemblies. Once such application would be the use of two such manipulators back-to-back as an expanded beam connector for coupling two optical fibres. It can also be used in relation to optical components other than optical fibre assemblies, for example the adjustment of the position of lenses or diffraction gratings or other optical elements.

What is claimed is:

1. A connector system for coupling an optical fibre assembly to an optical component, comprising:
    a connector body having a throughbore adapted to receive an optical fibre assembly in use, the optical fibre assembly is removably retained in the connector body such that it can be repeatedly removed therefrom and reinserted therein, the connector system can be arranged such that one or more discrete rotational orientations of the optical fibre assembly within the connector's throughbore can be identified and arranged; and
    a polarising element for polarising electromagnetic radiation that passes through it located in the throughbore such that electromagnetic radiation passing through the throughbore will pass through the polarising element.

2. The system of claim 1, further comprising a resilient biassing arrangement for resiliently biassing the optical fibre assembly against the connector body.

3. The system of claim 2, wherein the resilient biassing arrangement is arranged such that the biassing force can be selectively removed and reapplied.

4. The system of claim 3, further comprising:
    one or more adjustors for adjusting the lateral position of an inserted optical fibre assembly within the connector body throughbore; and
    a user operable member for selectively removing and reapplying the biassing force; wherein the user operable member for removing and reapplying the resilient biassing force can be accessed by a user from the same side of the connector body as the adjustors.

5. The system of claim 2, wherein the resilient biassing arrangement is arranged such that when an optical fibre assembly is inserted, the resilient biassing arrangement retains some resilience.

6. The system of claim 2, wherein the resilient biassing arrangement is arranged to apply the resilient biassing force automatically when an optical fibre assembly is inserted in the connector body, but is operable by a user to release the force being applied.

7. The system of claim 1, further comprising a separate carrier that receives the optical fibre assembly in use.

8. The system of claim 7, wherein the polarising element is mounted on or in the carrier.

9. The system of claim 7, further comprising a separable keying component that is securable to an optical fibre assembly and mates with at least the carrier in one rotational orientation only.

10. A connector system according to claim 7, wherein the carrier has one or more substantially planar lands on its outer surface.

11. The system of claim 1, wherein the connector body comprises a manipulator having a throughbore for receiving an optical fibre assembly in use, which manipulator includes one or more adjustors that are adjustable by a user to move an inserted optical fibre assembly relative to the manipulator in a direction perpendicular to the longitudinal axis of the manipulator throughbore.

12. The system of claim 11, wherein the manipulator further comprises a resilient biassing arrangement for resiliently biassing an inserted optical fibre assembly against the adjustors when it is inserted in the manipulator.

13. The system of claim 11, wherein the polarising element is mounted on or in the manipulator.

14. The system of claim 1, further comprising a separate carrier that receives the optical fibre assembly in use, a first resilient biassing arrangement for biassing an inserted optical fibre assembly against the connector body and a second resilient biassing arrangement for biassing the carrier against the connector body.

15. The system of claim 14, wherein the first resilient biassing arrangement is arranged such that the resilient biassing force on the optical fibre assembly can be selectively removed and reapplied.

16. A connector system according to claim 1, further comprising:
    a carrier having a carrier body having a carrier throughbore adapted to receive the optical fibre assembly in use;
    wherein the connector body comprises a manipulator having a manipulator body having a manipulator throughbore adapted to receive removably the carrier and optical fibre assembly in use, the manipulator further including one or more adjustors which are engageable against the outer surface of the carrier when it is inserted in the manipulator throughbore and are adjustable by a user to then move the carrier relative to the manipulator in a direction perpendicular to the longitudinal axis of the manipulator throughbore; the system further being arranged such that when an optical fibre assembly is inserted in the carrier movement of said adjustors to effect movement of said carrier relative to the manipulator causes corresponding movement of the optical fibre assembly relative to the manipulator.

17. The system of claim 16, wherein the polarising element is mounted on or in the carrier.

18. A connector system according to claim 1, further comprising:
    a carrier having a carrier body having a throughbore for receiving the optical fibre assembly in use; wherein the connector body comprises a throughbore for receiving the carrier and optical fibre assembly in use; and the connector system further comprises a retainer for retaining the optical fibre assembly, the carrier and the connector body in a fixed relationship to each other when the optical fibre assembly and the carrier are inserted in the connector body in such a manner that the optical fibre assembly is removable from the connector body independently of the carrier once it has been inserted therein.

19. The system of claim 18 wherein the polarising element is mounted on or in the carrier.

20. A connector system according to claim 1, further comprising:
    a carrier having a carrier body having a throughbore adapted to receive the optical fibre assembly in use, the carrier being removably positioned in the connector body;
    the connector body further includes a first resilient biassing arrangement for resiliently biassing the carrier against the connector body, and a second resilient biassing arrangement for resiliently biassing the optical fibre assembly against the carrier and thereby against the connector body.

21. The system of claim 20, wherein the second resilient biassing arrangement is arranged such that the resilient biassing force on the optical fibre assembly can be selectively removed and reapplied.

22. The system of claim 1, wherein the polarising element has a polarising axis, and wherein the polarising axis is indicated on the connector system.

23. The system of claim 1, further comprising fixings provided in or on the connector body for fixing the connector body to another component, wherein the polarising element is arranged in a fixed relationship relative to said fixings.

24. The system of claim 1, further comprising the optical fibre assembly, and wherein the polarising element is mounted in or on and is carried by the optical fibre assembly.

25. The system of claim 1, wherein the polarising element is mounted in or on the connector body.

26. The system of claim 1, wherein the polarising element is mounted on or in another component that is in or can be carried in the connector body.

27. The system of claim 1, wherein the polarising element is in use fixed in a particular alignment relative to the connector body.

28. The system of claim 1, wherein the connector system is arranged such that a single discrete rotational orientation of an optical fibre assembly within the connector's throughbore can be identified and arranged.

29. The system of claim 1, further comprising a separable keying component which mates with the connector body in a fixed orientation with respect to rotation about the longitudinal axis of the connector body throughbore, the keying component being securable to an optical fibre assembly.

30. The system of claim 1, further comprising one or more adjustors for adjusting the lateral position of an inserted optical fibre assembly within the connector body throughbore.

31. A connector system according to claim 1, further comprising:
a carrier having a carrier body having a carrier throughbore adapted to receive the optical fibre assembly in use;
wherein the connector body comprises a manipulator having a manipulator body having a manipulator throughbore adapted to receive removably the carrier and the optical fibre assembly in use, the manipulator further including one or more adjustors which are engageable against the outer surface of the carrier when it is inserted in the manipulator throughbore and are adjustable by a user to then move the carrier relative to the manipulator in a direction perpendicular to the longitudinal axis of the manipulator throughbore; the system further being arranged such that when the optical fibre assembly is inserted in the carrier movement of said adjustors to effect movement of said carrier relative to the manipulator causes corresponding movement of the optical fibre assembly relative to the manipulator; and wherein the carrier includes one or more lands on its outer surface arranged such that the carrier can be inserted into the manipulator in such a way that the adjustors will in use engage only the lands, the lands further being arranged such that the carrier can only be so inserted into the manipulator in one or more discrete orientations with respect to rotation about the longitudinal axis of the manipulator throughbore; and the carrier includes a separable keying component which mates with the carrier body in a fixed orientation with respect to rotation about the longitudinal axis of the carrier throughbore, the keying component being adapted to be securable to an optical fibre assembly such that while it is so secured it remains in a fixed orientation with respect to rotation about the longitudinal axis of the optical fibre assembly.

32. A connector system according to claim 1, further comprising:
a separate carrier that receives the optical fibre assembly in use;
a separable collar which mates with the carrier body in a fixed orientation with respect to rotation about the longitudinal axis of the carrier, the collar being adapted to be securable to said optical fibre assembly such that while it is so secured it remains in a fixed orientation with respect to rotation about a longitudinal axis of the optical fibre assembly.

33. A connector system according to claim 1, further comprising:
a resilient biassing arrangement for selectively resiliently biassing an inserted optical fibre assembly against the connector body; wherein the resilient biassing arrangement for selectively applying a resilient biassing force is arranged such that the adjustment it provides is constrained to ensure that there is always some resilient play left in the resilient biassing arrangement.

34. A connector system according to claim 1, wherein the connector body includes:
a manipulator having a manipulator body having a manipulator throughbore adapted to receive removably the optical fibre assembly in use; the manipulator further including one or more adjustors which are adjustable by a user to move an optical fibre assembly inserted in the manipulator throughbore relative to the manipulator in a direction perpendicular to the longitudinal axis of the manipulator throughbore, a resilient biassing arrangement for resiliently biassing an inserted optical fibre assembly against the adjustors, and a user-operable member for selectively removing and applying the resilient biassing force to resiliently bias an inserted optical fibre assembly against the adjustors; wherein the adjustors and user-operable member for selectively applying the resilient biassing force are arranged such that they are accessible by a user from the same side of the manipulator body.

35. A connector system according to claim 1, further comprising:
a resilient biassing arrangement for resiliently biassing an inserted optical fibre assembly against the connector body; and
a user-operable member for selectively applying the resilient biassing force that is moveable in use to draw the resilient biassing arrangement towards and away from an optical fibre assembly which is inserted in the throughbore, the resilient biassing arrangement being arranged on an opposing side of the throughbore to the user-operable member for selectively applying the resilient biassing force.

* * * * *